(12) United States Patent
Khemakhem et al.

(10) Patent No.: US 7,780,479 B2
(45) Date of Patent: Aug. 24, 2010

(54) JACK WITH MODULAR MOUNTING SLEEVE

(75) Inventors: M'hamed Anis Khemakhem, Minnetonka, MN (US); Kenneth Allen Skluzacek, North Mankato, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 118 days.

(21) Appl. No.: 12/150,755

(22) Filed: Apr. 29, 2008

(65) Prior Publication Data

US 2009/0011654 A1    Jan. 8, 2009

Related U.S. Application Data

(63) Continuation of application No. 11/488,448, filed on Jul. 17, 2006, now Pat. No. 7,371,124, which is a continuation of application No. 11/246,767, filed on Oct. 7, 2005, now Pat. No. 7,108,561, which is a continuation of application No. 10/990,814, filed on Nov. 17, 2004, now Pat. No. 6,953,368, which is a continuation of application No. 10/700,366, filed on Nov. 3, 2003, now Pat. No. 6,848,948.

(51) Int. Cl.
*H01R 24/04*    (2006.01)
(52) U.S. Cl. ............... 439/668; 439/752.5; 439/717
(58) Field of Classification Search .......... 439/668, 439/752.5, 717, 188, 944
See application file for complete search history.

(56) References Cited

U.S. PATENT DOCUMENTS

| | | | |
|---|---|---|---|
| 2,925,577 A | 2/1960 | Cetran et al. | |
| 3,020,365 A | 2/1962 | Neeman | |
| 3,109,997 A | 11/1963 | Giger et al. | |
| 3,556,334 A | 1/1971 | Howard | |
| 3,663,901 A | 5/1972 | Forney, Jr. | |
| 3,701,083 A | 10/1972 | Ziegler, Jr. | |
| 3,873,785 A | 3/1975 | Lieberman | |
| 3,946,390 A | 3/1976 | Alexander et al. | |
| 3,980,385 A | 9/1976 | Hirokawa et al. | |

(Continued)

FOREIGN PATENT DOCUMENTS

EP    0 561 238 A    9/1993

(Continued)

OTHER PUBLICATIONS

Exhibit A, Article entitled "Avoiding the Pitfalls in Serial Digital Signal Distribution," from SMPTE Journal, pp. 14-23 (Jan. 1993).

(Continued)

*Primary Examiner*—Tho D Ta
(74) *Attorney, Agent, or Firm*—Merchant & Gould P.C.

(57) ABSTRACT

A housing for a coaxial jack including an opening for receiving the jack, the opening including a guide for preventing rotation of the jack within the opening. The housing also includes a stop to limit sliding of the jack within the opening and a flange extending from an outer surface. An outer face opposite the flange includes a ridge and a groove. A housing for coaxial jacks includes a pair of openings for receiving jacks. Each opening includes a guide to prevent rotation and a stop to limit sliding of the jack within the opening.

21 Claims, 22 Drawing Sheets

U.S. PATENT DOCUMENTS

| | | | |
|---|---|---|---|
| 4,099,825 A | 7/1978 | Jackson |
| 4,231,003 A | 10/1980 | Ishimaru |
| 4,264,115 A | 4/1981 | Chow |
| 4,749,968 A | 6/1988 | Burroughs |
| 4,789,351 A | 12/1988 | Fisher, Jr. et al. |
| 4,815,104 A | 3/1989 | Williams et al. |
| 4,820,200 A | 4/1989 | Lau |
| 4,824,399 A | 4/1989 | Bogar et al. |
| 4,925,403 A | 5/1990 | Zorzy |
| 4,938,707 A | 7/1990 | Guimond et al. |
| 4,941,846 A | 7/1990 | Guimond et al. |
| 4,950,840 A | 8/1990 | Zetena |
| 4,971,569 A | 11/1990 | Gooch et al. |
| 4,971,578 A | 11/1990 | Wilson |
| 5,090,915 A | 2/1992 | Moulton |
| 5,096,444 A | 3/1992 | Lu et al. |
| 5,194,020 A | 3/1993 | Voltz |
| 5,233,501 A | 8/1993 | Allen et al. |
| 5,246,378 A | 9/1993 | Seiceanu |
| 5,280,254 A | 1/1994 | Hunter et al. |
| 5,329,262 A | 7/1994 | Fisher, Jr. |
| 5,348,491 A | 9/1994 | Louwagie et al. |
| 5,382,173 A | 1/1995 | Brown et al. |
| 5,417,588 A | 5/1995 | Olson et al. |
| 5,450,011 A | 9/1995 | Boeijen et al. |
| 5,467,062 A | 11/1995 | Burroughs |
| 5,475,394 A | 12/1995 | Kohls et al. |
| 5,482,469 A | 1/1996 | Seiceanu et al. |
| 5,489,222 A | 2/1996 | Moyer et al. |
| 5,498,175 A | 3/1996 | Yeh et al. |
| 5,503,566 A | 4/1996 | Wang |
| 5,518,414 A | 5/1996 | Antonini et al. |
| 5,567,179 A | 10/1996 | Voltz |
| 5,577,924 A | 11/1996 | Louwagie |
| 5,585,768 A | 12/1996 | Wei |
| 5,599,198 A | 2/1997 | Wang |
| 5,654,679 A | 8/1997 | Mavretic et al. |
| 5,700,160 A | 12/1997 | Lee |
| 5,702,262 A | 12/1997 | Brown et al. |
| 5,865,654 A | 2/1999 | Shimirak et al. |
| 5,876,253 A | 3/1999 | Martucci et al. |
| 5,885,096 A | 3/1999 | Ogren |
| 5,913,701 A | 6/1999 | Olson et al. |
| 5,964,607 A | 10/1999 | Finke et al. |
| 6,045,378 A | 4/2000 | Follingstad |
| 6,062,910 A | 5/2000 | Braquet et al. |
| 6,065,997 A | 5/2000 | Wang |
| 6,113,431 A | 9/2000 | Wong |
| 6,213,801 B1 | 4/2001 | Tayloe et al. |
| 6,224,421 B1 | 5/2001 | Maturo, Jr. |
| 6,227,868 B1 | 5/2001 | Wlodarski |
| 6,241,562 B1 | 6/2001 | Benda et al. |
| 6,250,960 B1 | 6/2001 | Youtsey |
| 6,276,970 B1 | 8/2001 | Wong |
| 6,409,550 B1 | 6/2002 | Splichal et al. |
| 6,504,726 B1 | 1/2003 | Grabinger et al. |
| 6,511,330 B1 | 1/2003 | Norris |
| 6,533,616 B2 | 3/2003 | Johnsen et al. |
| 6,572,413 B2 | 6/2003 | Olson et al. |
| 6,575,792 B2 | 6/2003 | Henneberger et al. |
| 6,589,062 B1 | 7/2003 | Ogren et al. |
| 6,597,256 B2 | 7/2003 | Khemakhem et al. |
| 6,608,764 B2 | 8/2003 | Clark et al. |
| 6,743,032 B2 | 6/2004 | Ogren et al. |
| 6,752,665 B2 | 6/2004 | Kha et al. |
| 6,761,588 B2 | 7/2004 | Heebe et al. |
| 6,761,594 B2 | 7/2004 | Johnsen et al. |
| 6,790,080 B2 | 9/2004 | Cannon |
| 6,808,426 B2 | 10/2004 | Liu |
| 6,811,432 B2 | 11/2004 | Cabalka et al. |
| 6,817,876 B2 | 11/2004 | Cooper et al. |
| 6,830,486 B2 | 12/2004 | Norris et al. |
| 6,835,093 B1 | 12/2004 | Griffin et al. |
| 6,846,195 B2 | 1/2005 | Annequin |
| 6,848,948 B1 | 2/2005 | Khemakhem et al. |
| 6,872,097 B2 | 3/2005 | Johnsen et al. |
| 6,881,076 B2 | 4/2005 | Baker |
| 6,881,099 B2 | 4/2005 | Henneberger et al. |
| 6,905,363 B2 | 6/2005 | Musolf et al. |
| 6,932,634 B2 | 8/2005 | Cooper et al. |
| 6,945,817 B2 | 9/2005 | Miyazaki et al. |
| 6,953,368 B2 * | 10/2005 | Khemakhem et al. ....... 439/668 |
| 7,070,457 B2 | 7/2006 | Kluempke |
| 7,074,080 B1 | 7/2006 | Khemakhem et al. |
| 7,108,561 B2 | 9/2006 | Khemakhem et al. |
| 7,128,604 B2 | 10/2006 | Hall |
| 7,175,455 B2 | 2/2007 | Khemakhem et al. |

FOREIGN PATENT DOCUMENTS

| | | |
|---|---|---|
| EP | 0 706 723 B1 | 5/1998 |
| EP | 1 107 368 A2 | 6/2001 |
| WO | WO 96/37929 | 11/1996 |

OTHER PUBLICATIONS

Exhibit B, Kings Electronic Co. Inc. Broadcast Video Products Catalog, front cover page, pp. 1 and 7, and back cover page (1991).

Exhibit C, Photographs of a Kings Electronic Co. Inc. Video Jack Part No. 7400-1, 1 page (known as prior art at least as early as Nov. 3, 2003).

ADC Telecommunications, Inc. "Broadcast Products," 11th Edition, Publication No. 1180270, front cover, table of contents, pp. 1-16, 45-67, 172-191, back cover (Aug. 2003).

Canford Audio Video Jackfield 12 photos (known as prior art at least as early as Nov. 3, 2003).

* cited by examiner

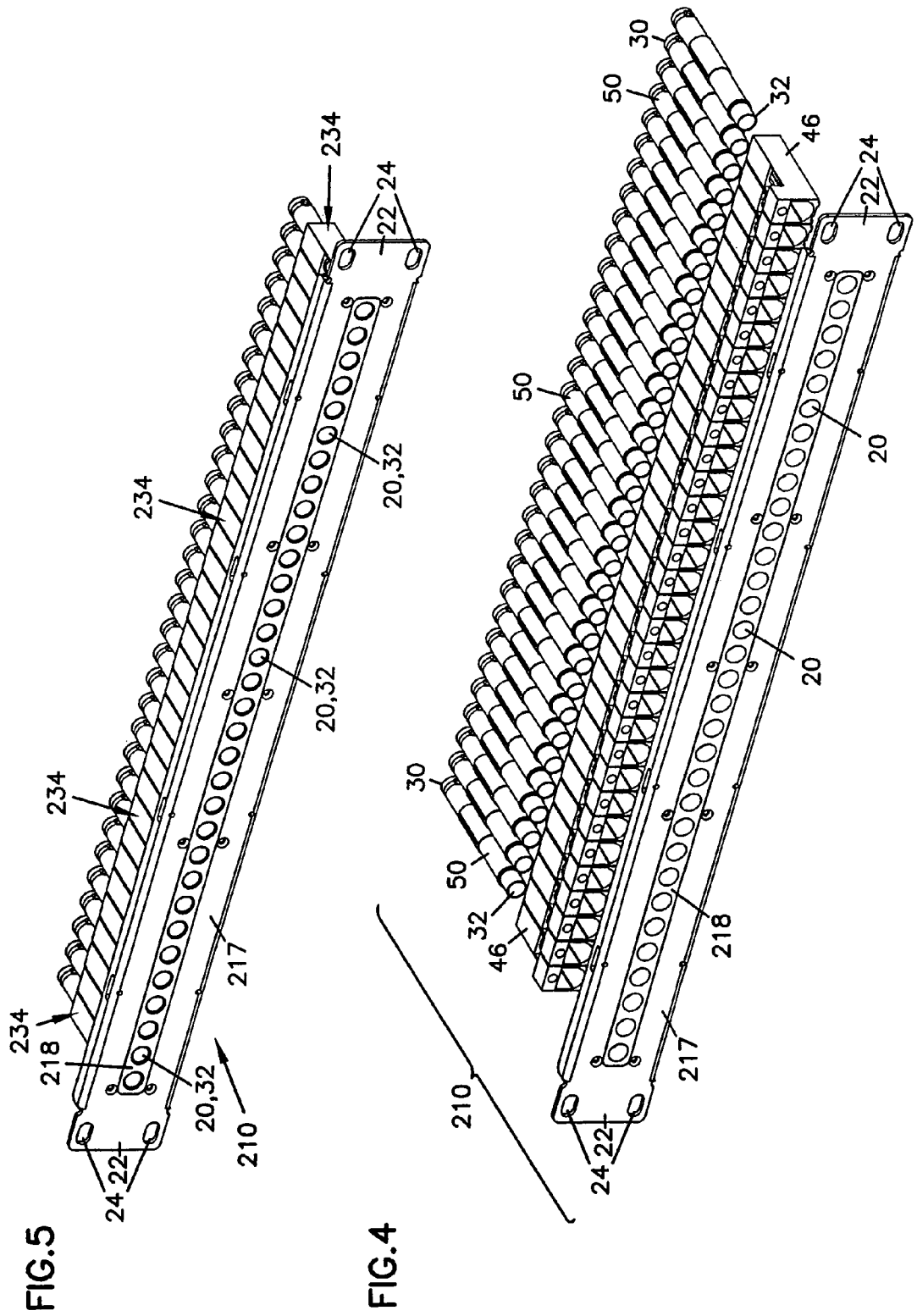

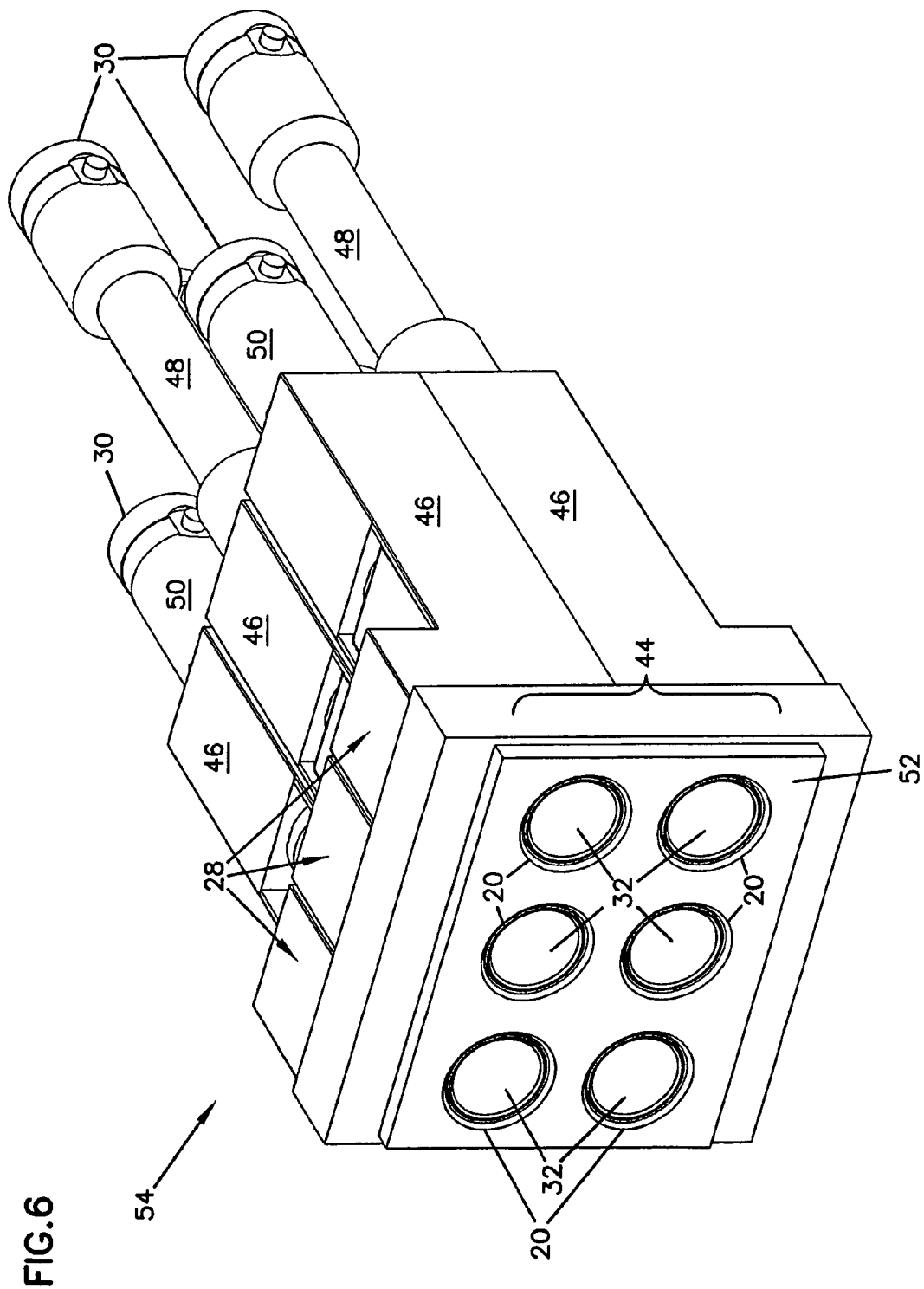

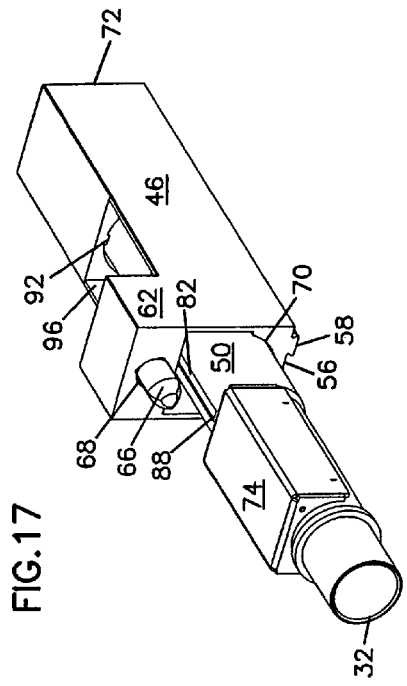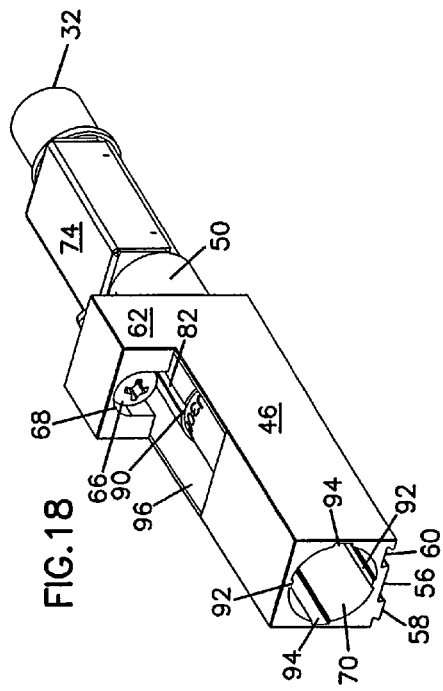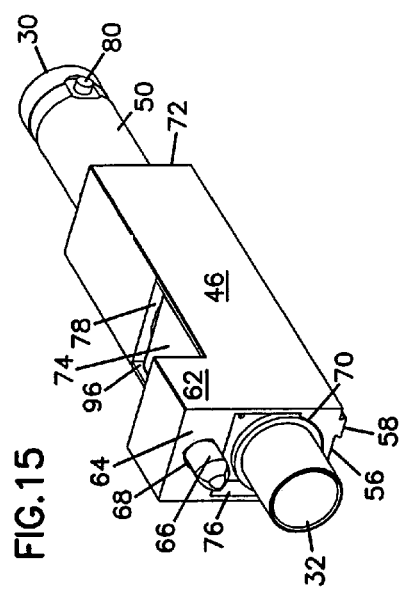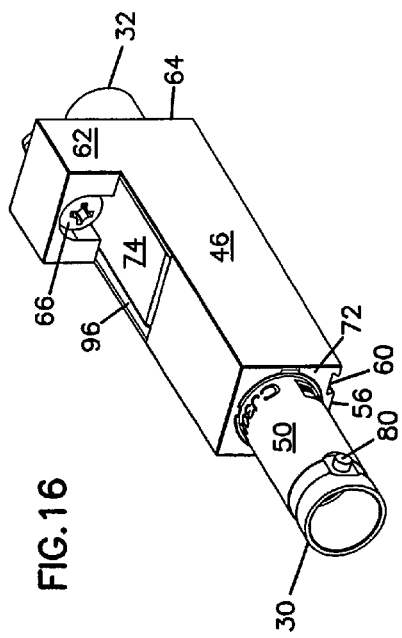

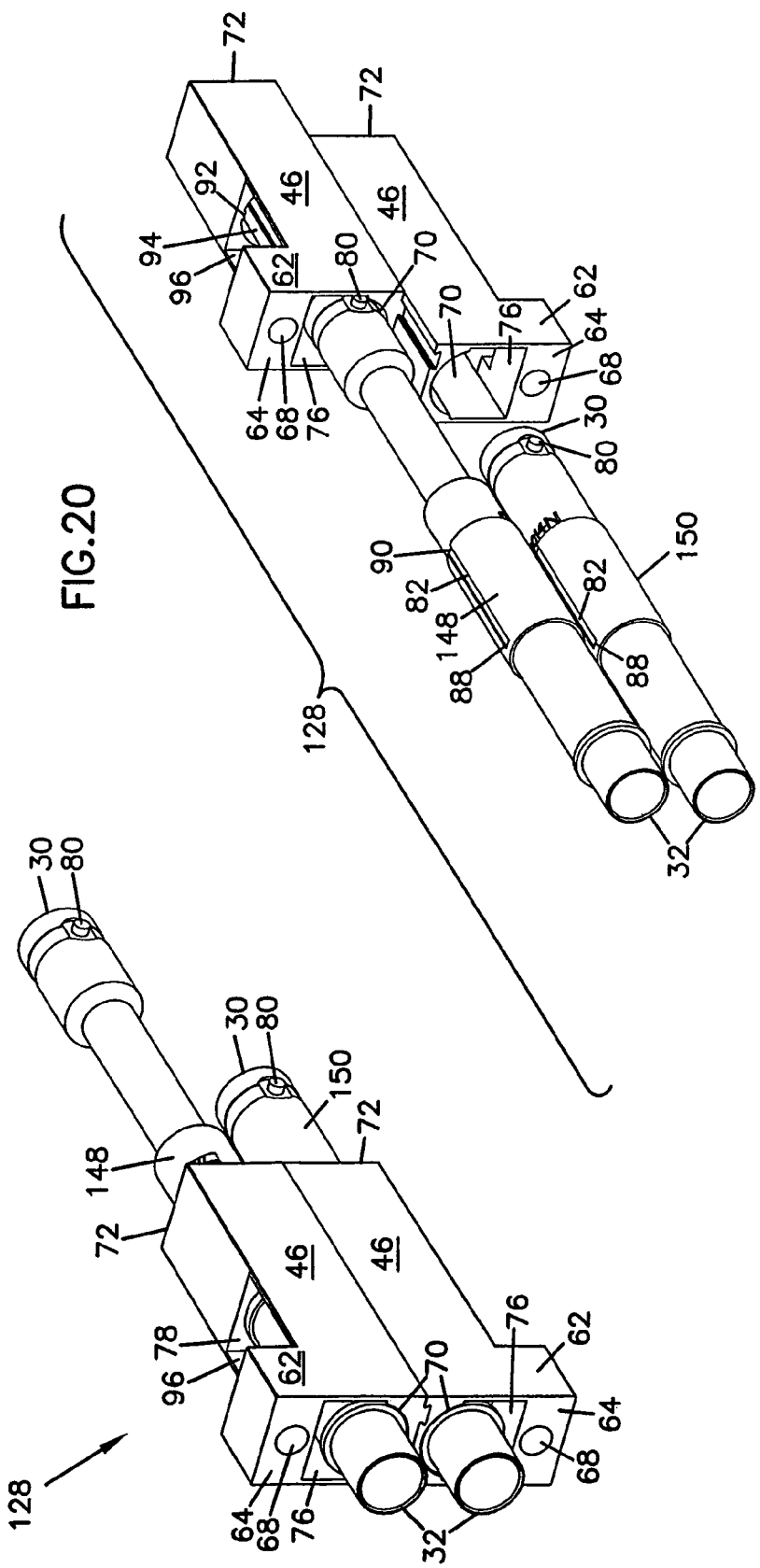

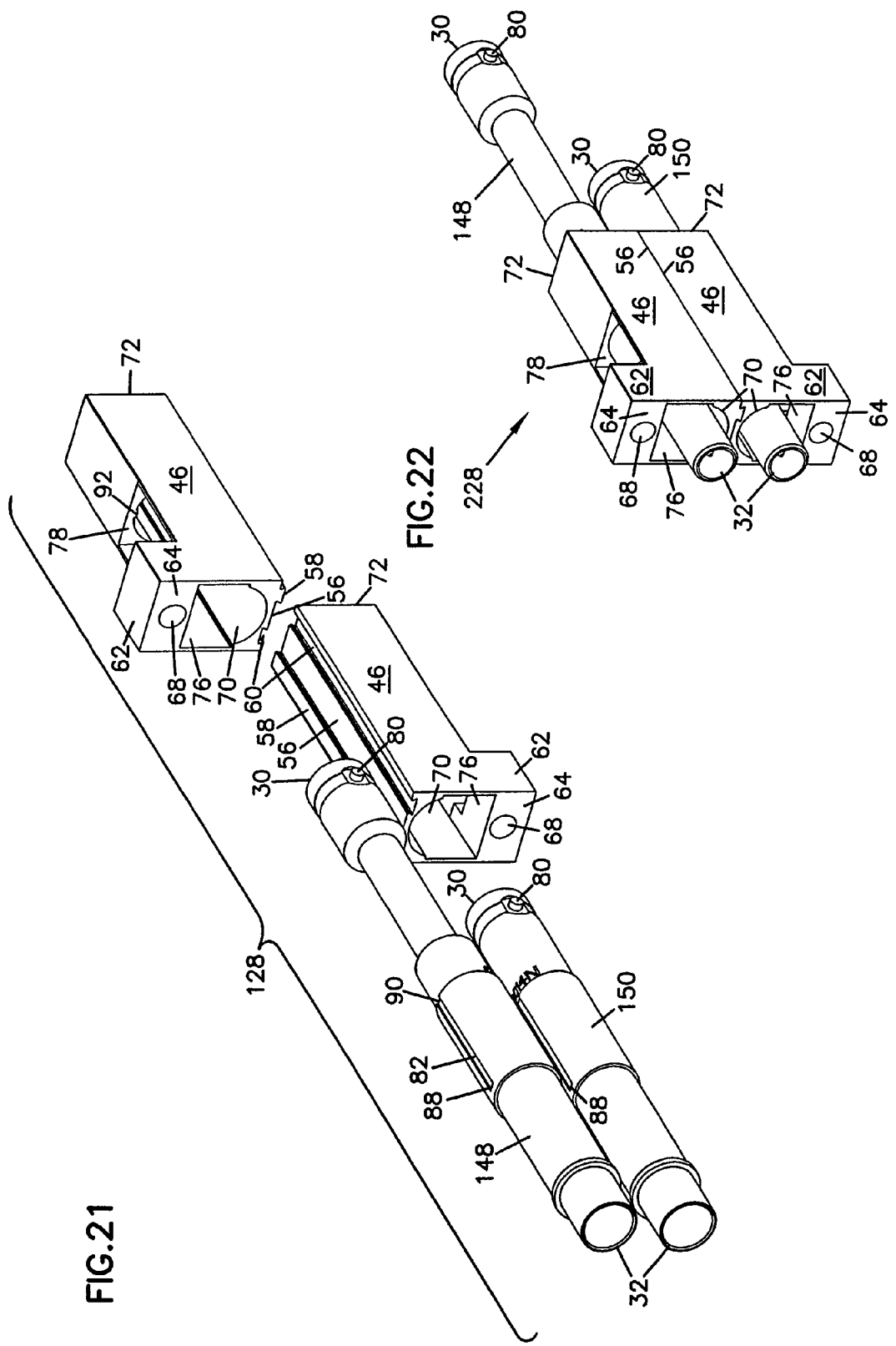

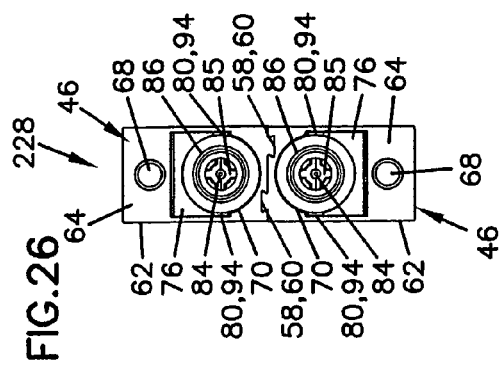
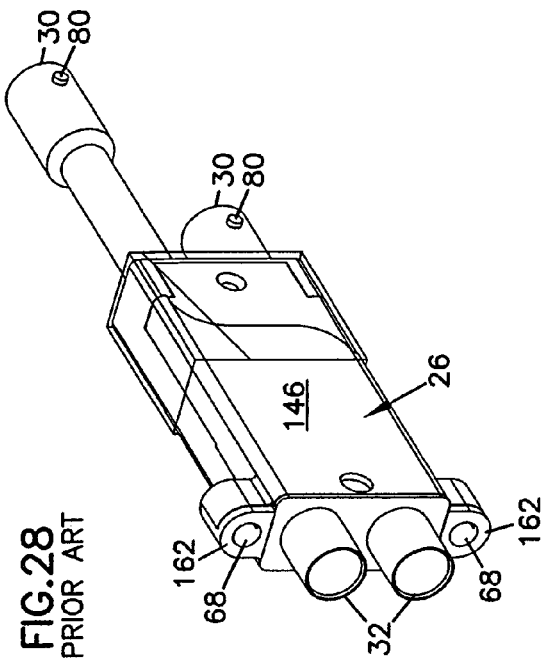
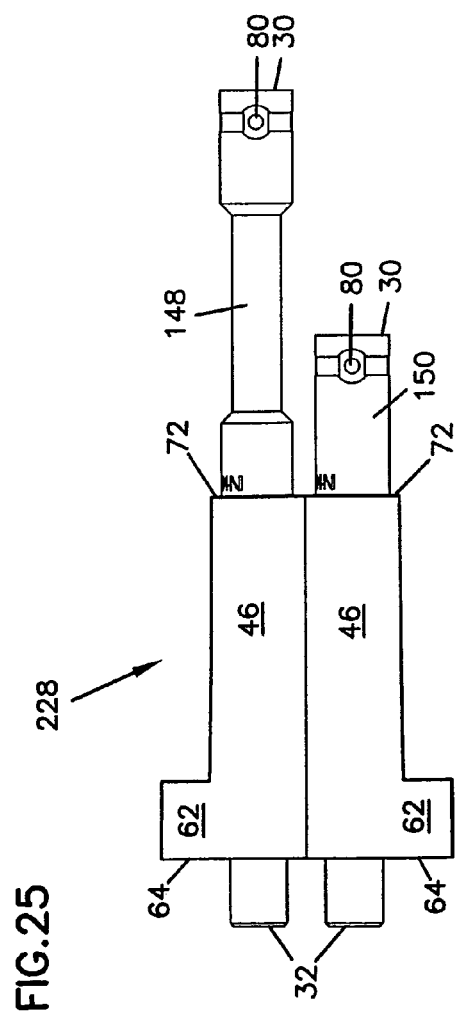
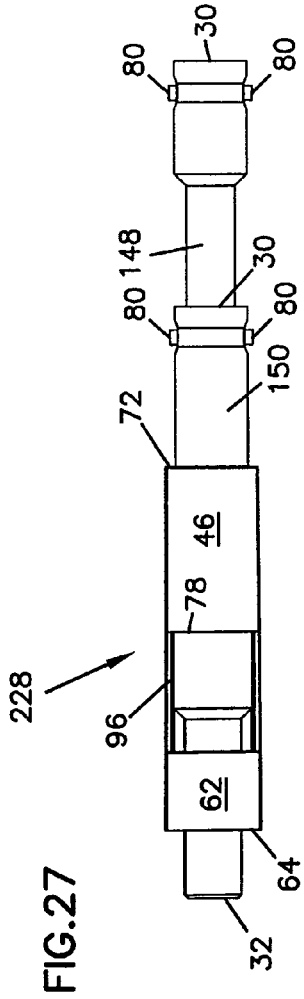

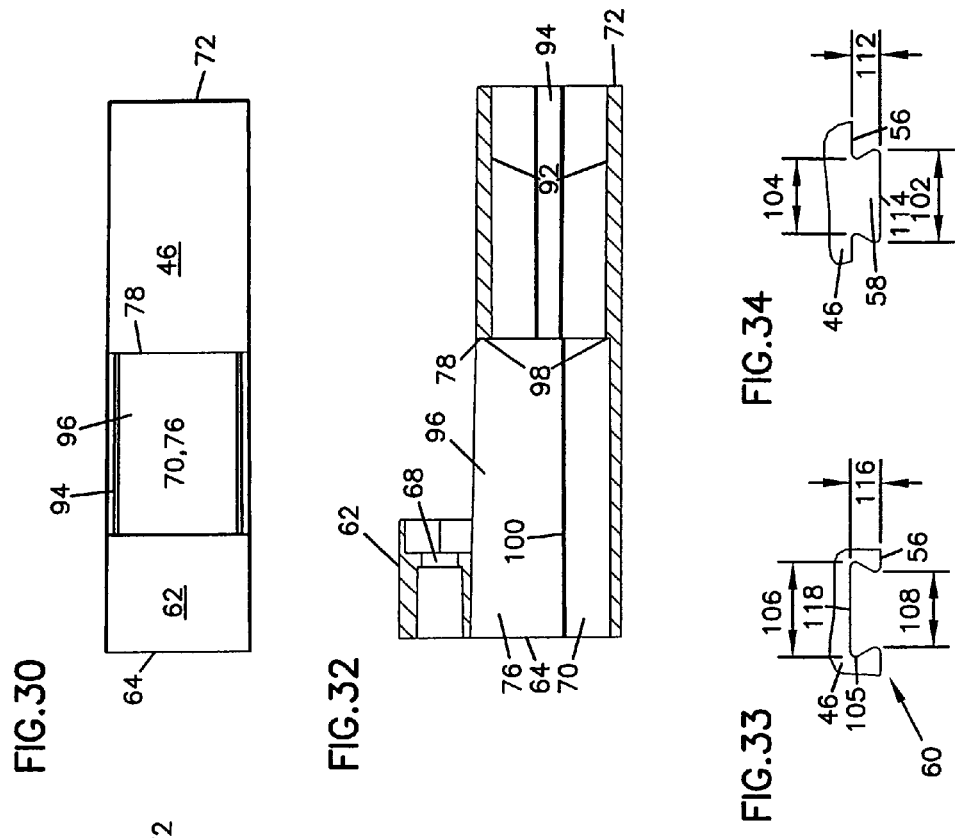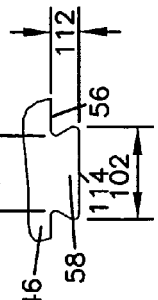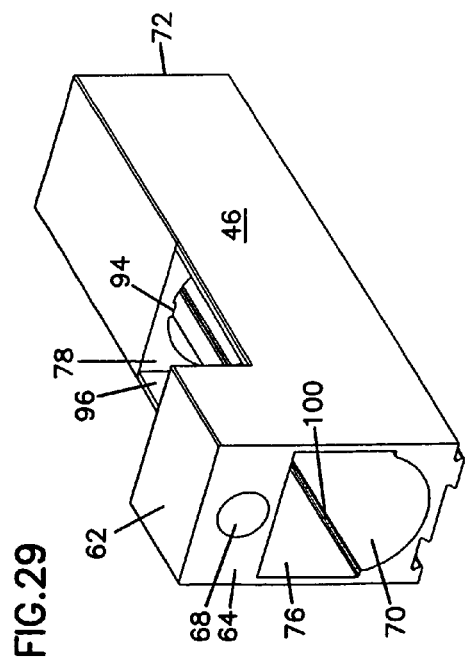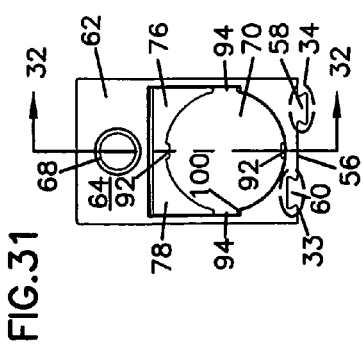

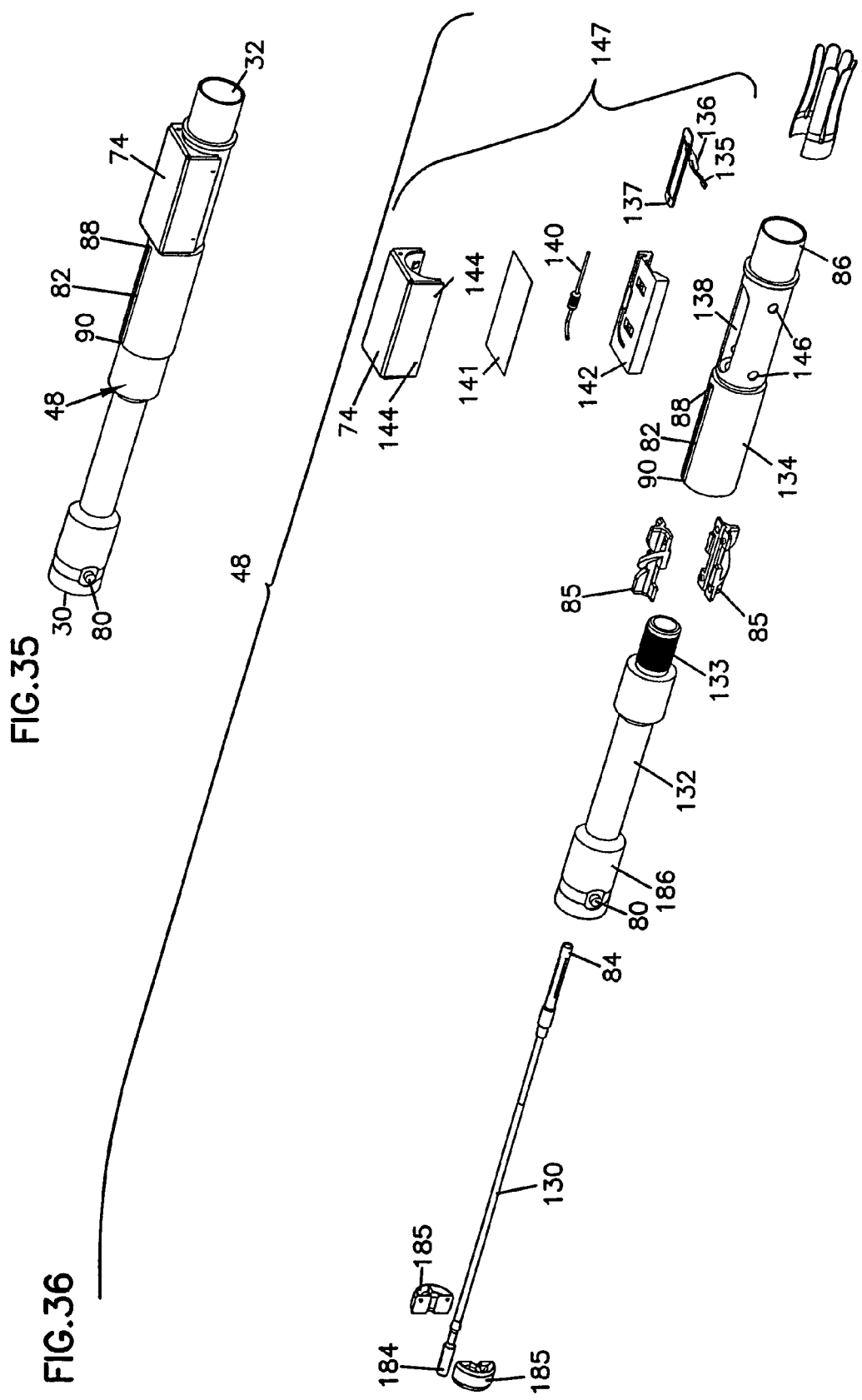

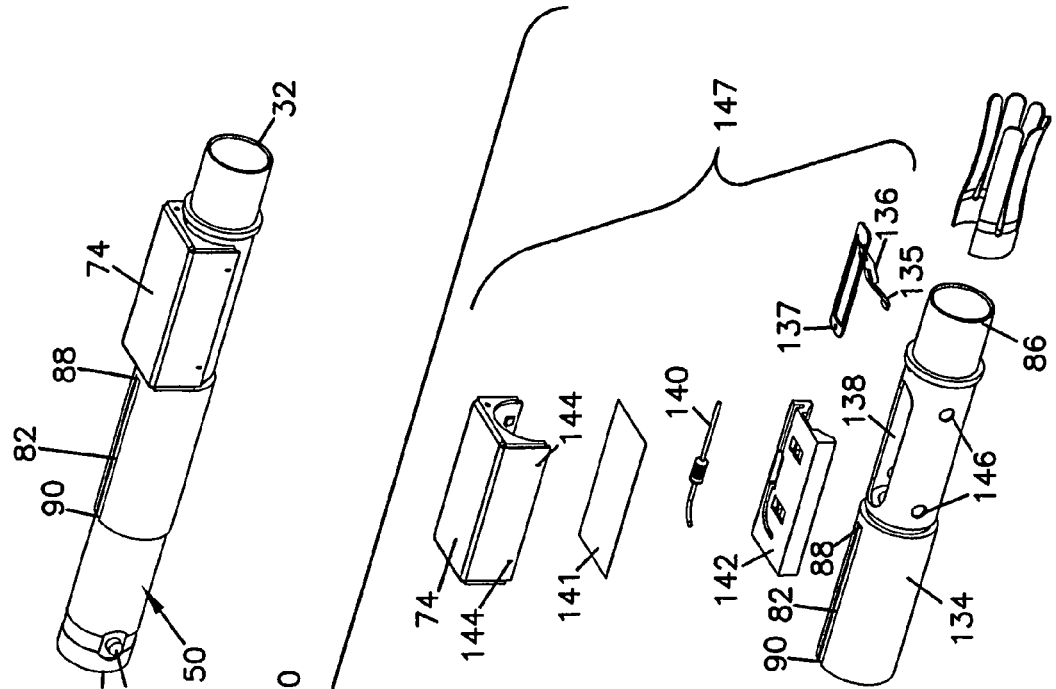
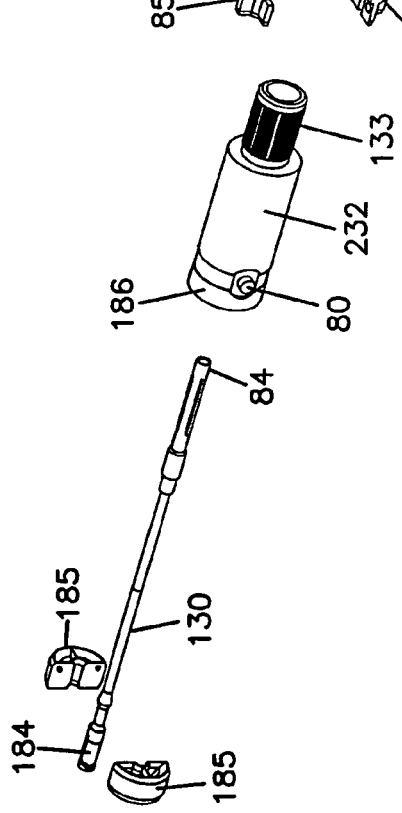
FIG. 38
FIG. 39

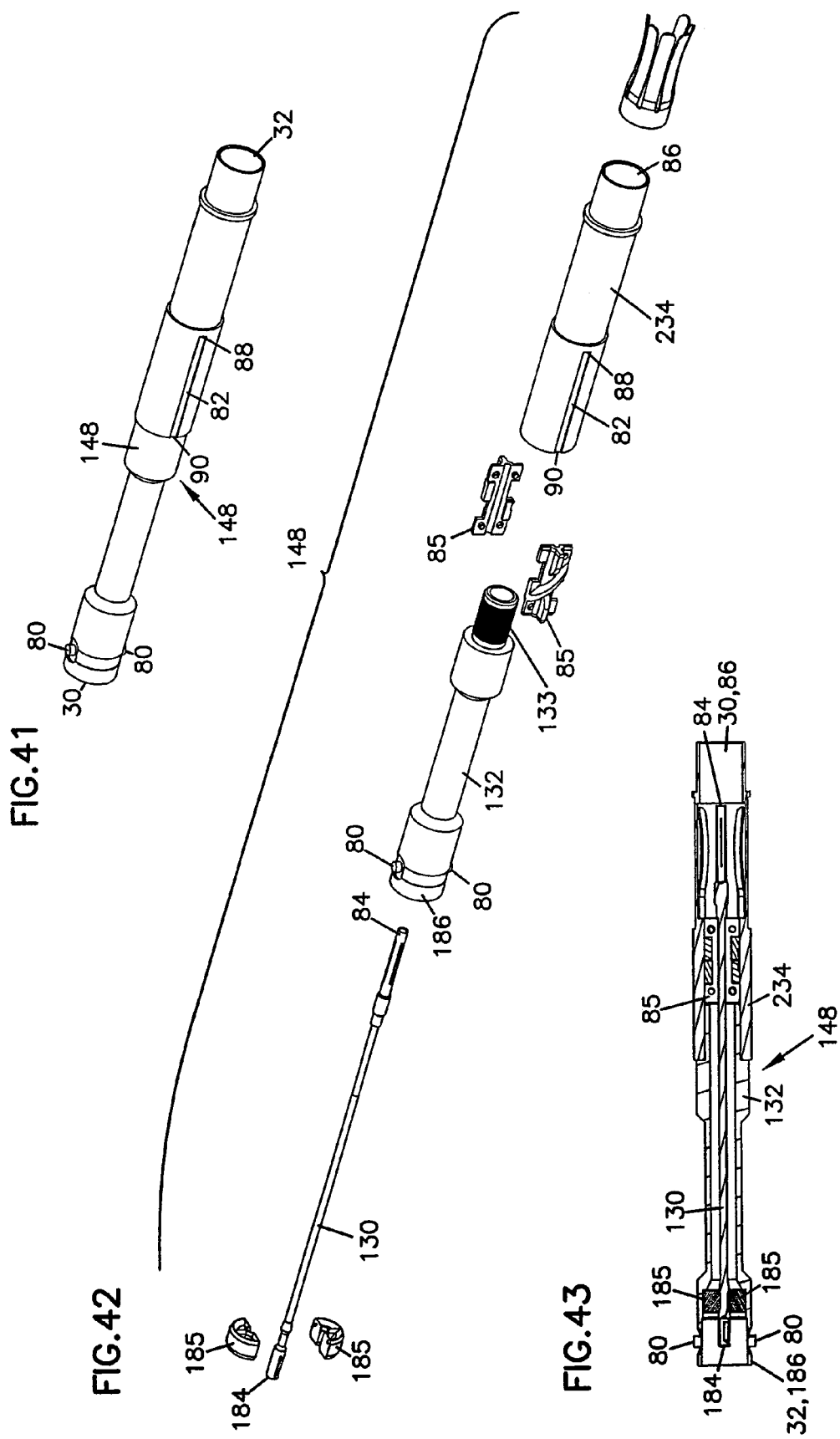

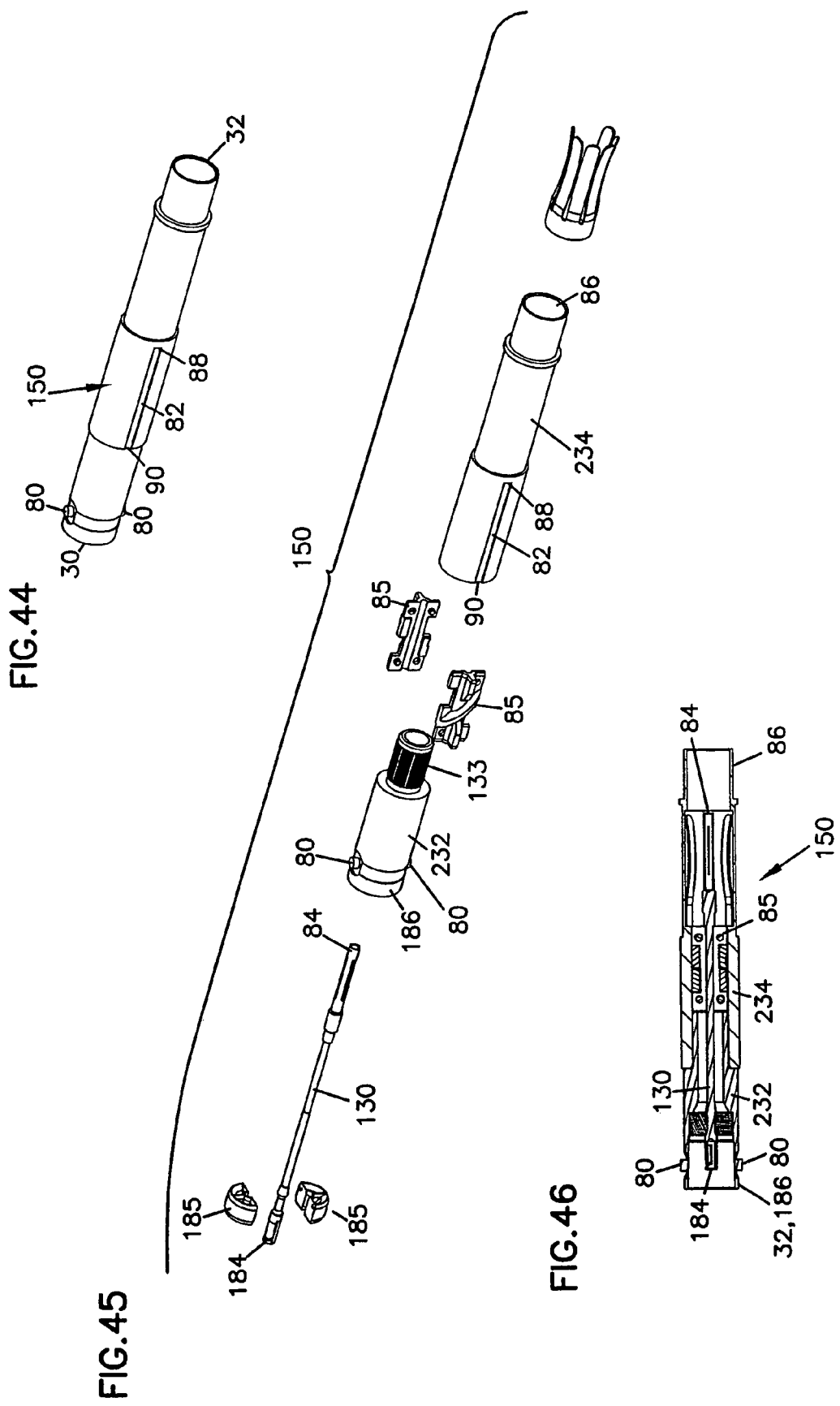

JACK WITH MODULAR MOUNTING SLEEVE

CROSS REFERENCE TO RELATED APPLICATIONS

This application is a continuation of application Ser. No. 11/488,448, filed Jul. 17, 2006 now U.S. Pat. No. 7,371,124, which is a continuation of application Ser. No. 11/246,767, filed Oct. 7, 2005, now U.S. Pat. No. 7,108,561, which is a continuation of application Ser. No. 10/990,814, filed Nov. 17, 2004, now U.S. Pat. No. 6,953,368, which is a continuation of application Ser. No. 10/700,366, filed Nov. 3, 2003, now U.S. Pat. No. 6,848,948, which applications are incorporated herein by reference.

FIELD OF THE INVENTION

The present invention generally relates to mounting connector jacks to facilitate connection of communications circuits.

BACKGROUND

In broadcast communications equipment installations, such as in a studio or production facility, it is common to have patch panels to interconnect a variety of signal sources with a variety of downstream processing, recording and broadcast equipment. These patch panels may mount jacks in paired combinations to provide input and output circuits to each piece of equipment. Also, these paired arrangements may include a single jack connected to a monitor circuit mounted adjacent to the jack pairs. Depending on the size and complexity of the installation, these patch panels may have a single paired set of jacks or may include many paired sets in a dense configuration. Other installation may include a single jack when patching with jack pairs is not required or for connecting to monitor circuits in a location separate from the patching jack pairs.

Some of the paired jacks may be combined into a switching jack pair while other pairs may be two straight through jacks mounted adjacent each other. The jack pairs in a switching jack may have a rigid housing about them to contain both of the jacks of the pair as well as the switching circuitry between the jacks. U.S. Pat. No. 5,885,096 shows an example switching jack. This rigid housing also provides support to the jacks themselves and helps to prevent deflection of the jacks. Individual straight through jacks mounted adjacent one another in pairs do not share such a housing. Strain from the cables attached to the jacks may cause the jacks to deflect. In some cases, the jacks deflect enough to come into contact with each other or other adjacently mounted jacks.

Improvements to the jacks are desirable.

SUMMARY OF THE INVENTION

The present invention relates generally to jacks for receiving plugs to electrically connect communications circuits. A modular housing provides support to jack assemblies mounted within the housings.

More specifically, the present invention relates housing for mounting coaxial jack assemblies.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows:

FIG. 4 is a perspective view of a third embodiment of a broadcast communications patch panel in accordance with the present invention, with a single row of openings.

FIG. 5 is an exploded perspective view of the panel of FIG. 4.

FIG. 6 is a front perspective view of a block of three jack pairs according to the present invention.

FIG. 15 is a front perspective view of one of the jacks of the jack pair of FIG. 9.

FIG. 16 is a rear perspective view of the jack of FIG. 15.

FIG. 17 is a front perspective view of the jack of FIG. 15 with the jack assembly partially removed from the housing.

FIG. 18 is a rear perspective view of the jack of FIG. 16 with the jack assembly partially removed from the housing.

FIG. 19 is a front perspective view of a second embodiment of a jack pair in accordance with the present invention.

FIG. 20 is a front perspective partially exploded view of the jack pair of FIG. 19.

FIG. 21 is a front perspective exploded view of the jack pair of FIG. 19.

FIG. 22 is a front perspective view of a third embodiment of a jack pair in accordance with the present invention.

FIG. 25 is a side view of the jack pair of FIG. 22.

FIG. 26 is an end view of the jack pair of FIG. 22.

FIG. 27 is a bottom view of the jack pair of FIG. 22.

FIG. 28 is a switching jack as shown mounted to the patch panel of FIGS. 1, 2, and 3.

FIG. 29 is a front perspective view of one of the housings of the jack pair of FIGS. 9, 19 and 22.

FIG. 30 is a top view of the housing of FIG. 29.

FIG. 31 is an end view of the housing of FIG. 29.

FIG. 32 is a side cross-sectional view of the housing of FIG. 29 taken along line 32-32 in FIG. 31.

FIG. 33 is an enlarged view of the portion labeled 33 in FIG. 31 showing the groove in greater detail.

FIG. 34 is an enlarged view of the portion labeled 34 in FIG. 31 showing the ridge in greater detail.

FIG. 35 is a perspective view of a jack assembly in accordance with the present invention.

FIG. 36 is an exploded perspective view of the jack assembly of FIG. 35.

FIG. 38 is a perspective view of a second embodiment of a jack assembly in accordance with the present invention.

FIG. 39 is an exploded perspective view of the jack assembly of FIG. 38.

FIG. 41 is a perspective view of a third embodiment of a jack assembly in accordance with the present invention.

FIG. 42 is an exploded perspective view of the jack assembly of FIG. 41.

FIG. 43 is a side cross-sectional view of the jack assembly of FIG. 41.

FIG. 44 is a perspective view of a fourth embodiment of a jack assembly in accordance with the present invention.

FIG. 45 is an exploded perspective view of the jack assembly of FIG. 44.

FIG. 46 is a side cross-sectional view of the jack assembly of FIG. 44.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
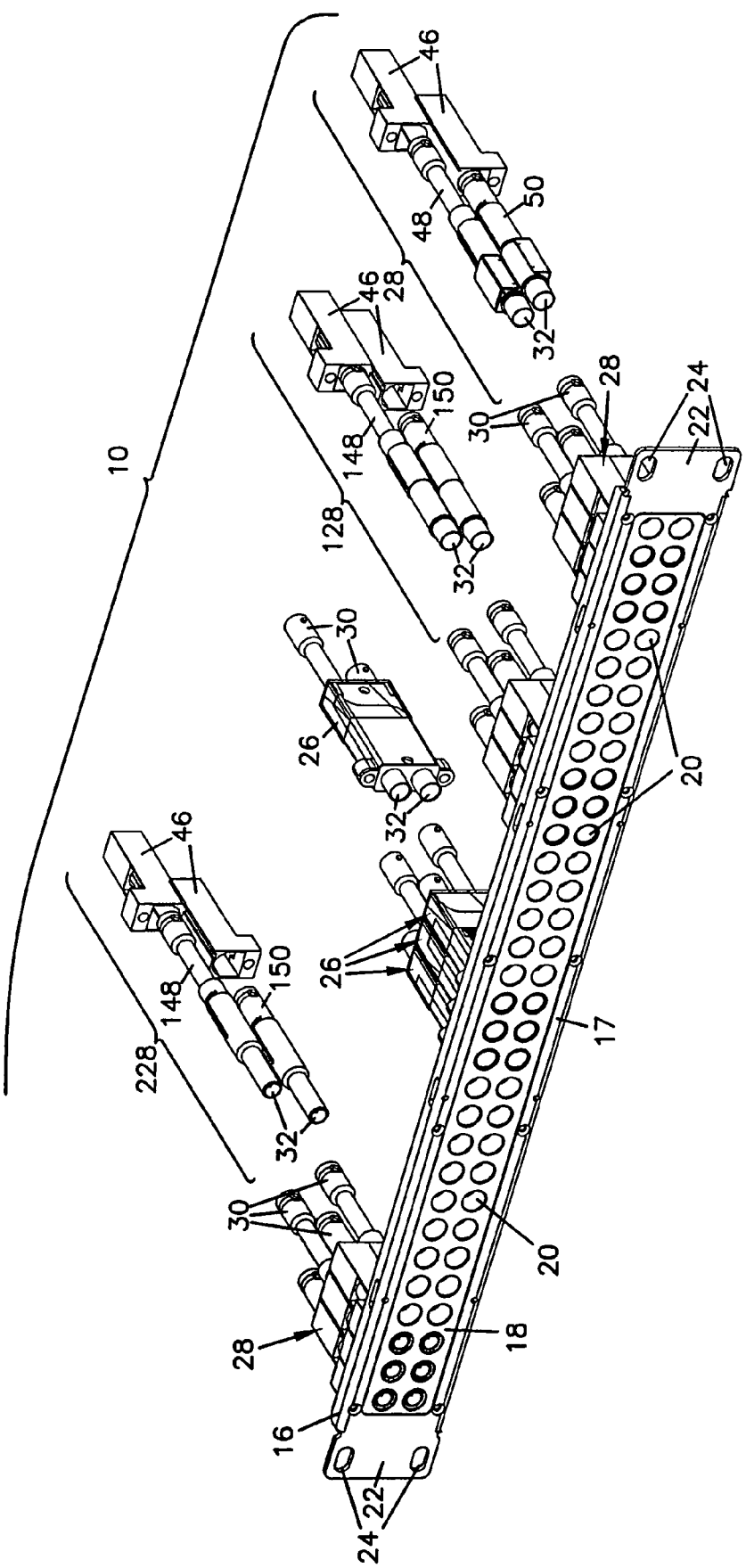
FIG. 1 is a front perspective view of a broadcast communications patch panel in accordance with the present application with some jacks shown in exploded view.

Patch panels such as a panel 10 in FIG. 1, might be installed in broadcast communications production facilities. Patch panels 10 include a chassis 16 including a mounting frame 17 and a panel front 18 with a plurality of pairs of openings 20. As shown, panel front 18 may be removed from frame 17 to allow different configurations of openings 20 to be included in panel 10. As shown, frame 17 is made of a durable material such as aluminum or steel to provide structural support to chassis 16. Other similar structural materials may be used for frame 17 such as other durable or rigid metals or composite materials. Panel front 18 is molded or formed from plastic or other similar non-conductive material to facilitate the creation of the more complex features of panel front 18 for mounting a variety of devices to chassis 16. A pair of opposing mounting flanges 22 are on either side of frame 17 to facilitate mounting panel 10 to a communications equipment rack or other mounting structure in broadcast facility. Flanges 22 include openings 24 for receiving fasteners to secure panel 10 to the rack or mounting structure.

Jacks pairs 26, 28, 128 and 228 for connecting communication circuits are mounted to a rear of panel front 18. Each of these jack pairs include a front set of connectors accessible though one of the openings 20 in panel front 18 and a rear set of connectors accessible from the rear of panel 10.

The jack pairs as shown include prior art switching jack pairs 26 and straight through jack pairs 28, 128 and 228. All of these jack pairs include a pair of rear connectors 30 for linking to communications cables extending behind panel 10 and a pair of front connectors 32 for connecting to communications cables extending in front of panel 10. Switching pair 26 provides internal circuitry so that without a plug inserted within either front connector 32, an electrical path is defined between the pair of rear connectors 30. No such circuitry is provided in straight through pairs 28, 128 and 228. U.S. Pat. No. 5,885,096, the disclosure of which is incorporated herein by reference, discloses a switching jack pair similar to switching jack pairs 26.

Jack pairs 28, 128 and 228 include a pair of housings 46, a long jack assembly or jack 48 or 148 and a short jack assembly or jack 50 or 150. Within each housing 46 is mounted one of the jack assemblies 48 or 148 and one of the jack assemblies 50 or 150. Jack pairs 28, 128 and 228, housing 46 and jacks 48, 148, 50 and 150 will be described in further detail below.

Figure 2:
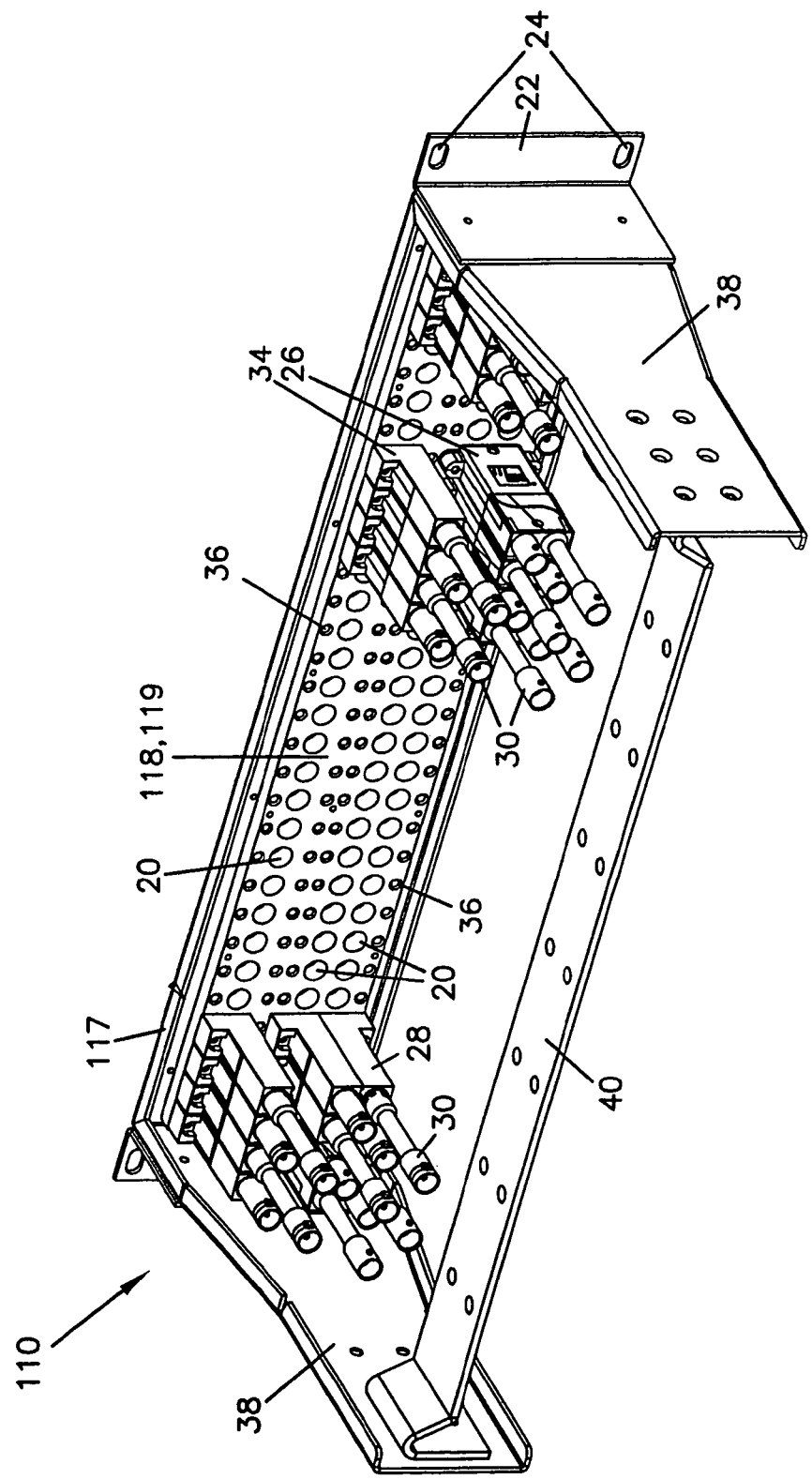
FIG. 2 is an upper rear perspective view of a second embodiment of a broadcast communications patch panel in accordance with the present invention, including monitor ports.
Figure 2A:
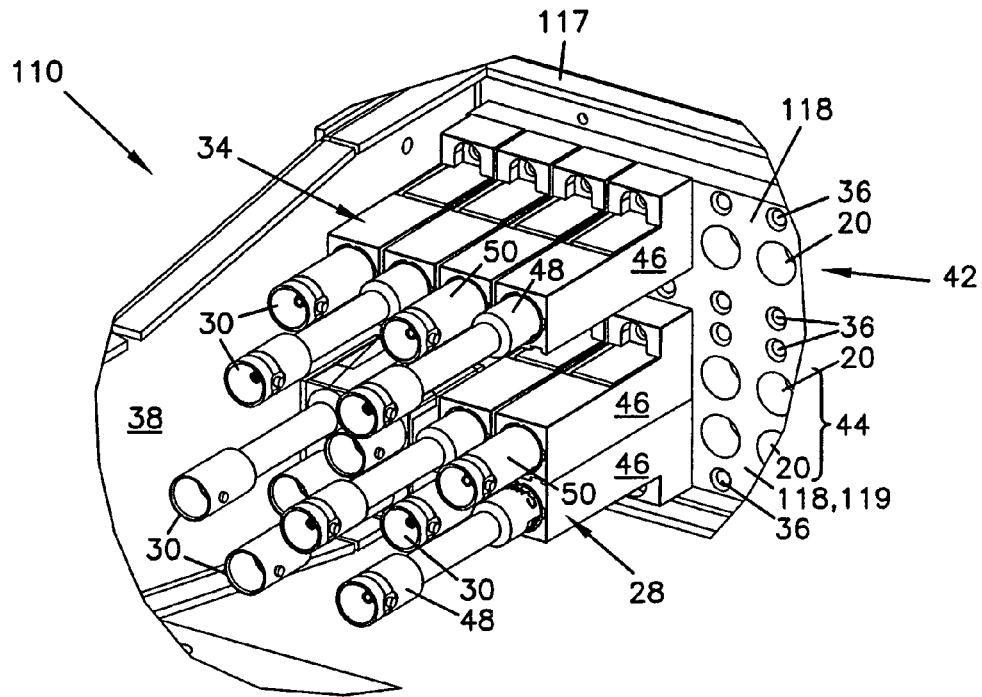
FIG. 2A is an enlarged rear perspective view of a group of jacks mounted to the patch panel of FIG. 2.
Figure 3A:
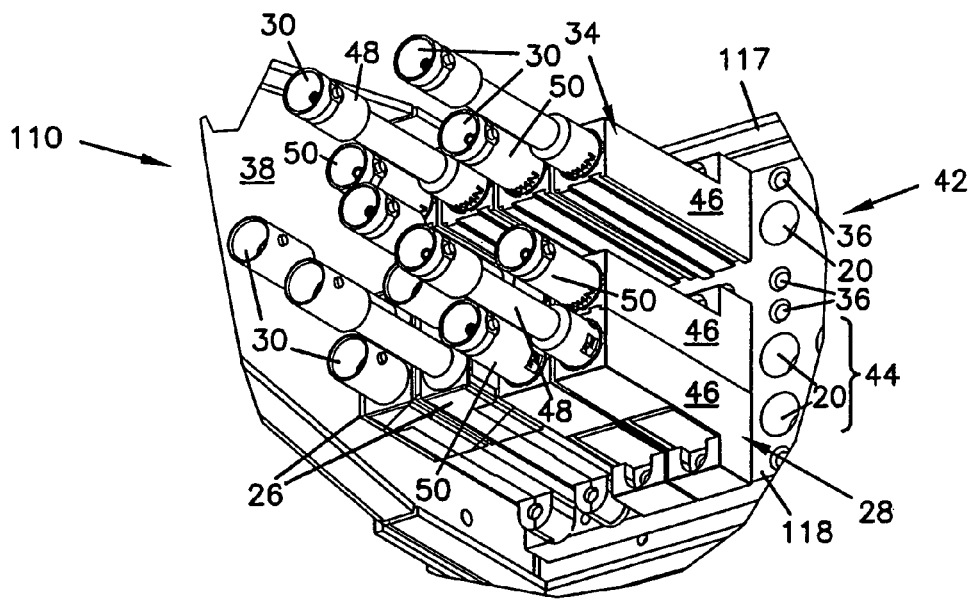
FIG. 3A is an enlarged rear perspective view of the group of jacks shown in FIG. 4.
Figure 3:
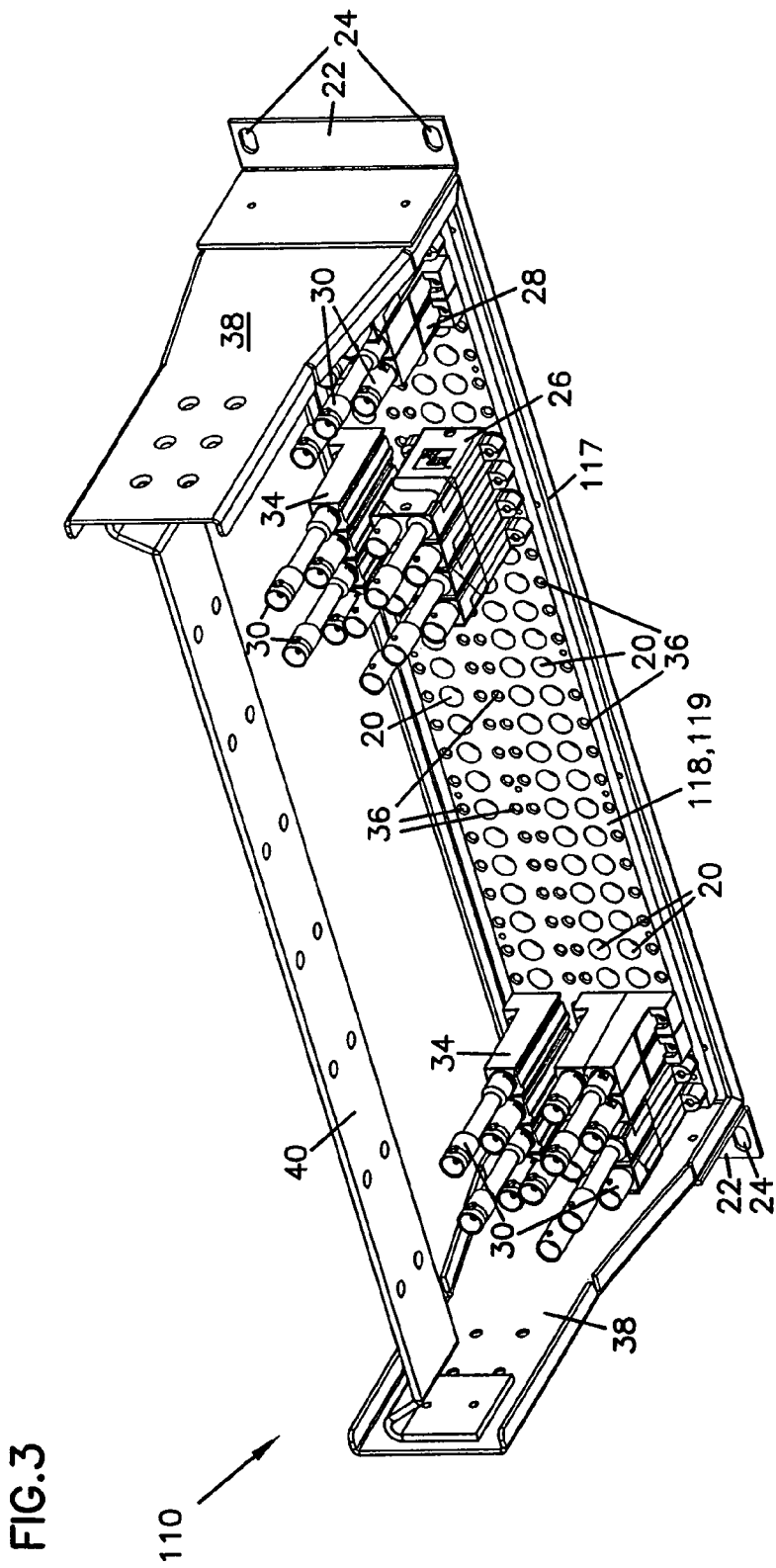
FIG. 3 is a lower rear perspective view of the patch panel of FIG. 2.

Referring now to FIGS. 2 and 3, an alternative embodiment patch panel 110 is shown. Panel 110 is similar to panel 10 in construction but includes a third row of openings 20 in a panel front 118 to which may be mounted monitor jacks 34. Panel front 118 is mounted in a frame 117. Monitor jack 34 also includes rear connector 30 and front connector 32 and these connectors 30 and 32 may be the same format as those of the adjacently mounted pairs 26 and 28. On a rear face 119 of panel front 118, a pair of fastener openings 36 are positioned adjacent each of the openings 20 in the monitor row and adjacent each pair of openings 20 for mounting pairs 26 and 28. Openings 36 each receive a fastener of a jack pair 26, 28, 128 or 228 or a monitor jack 34 to mount these devices to panel front 118. Similar openings 36 are also positioned on the rear of panel front 18 of panel 10. Panel front 118 is removably mounted to frame 117 to permit the configuration of openings 20 and 36 of panel 110 to be changed.

Extending rearward from frame 117 adjacent panel front 118 and mounting flanges 22 are a pair of sides 38. A tie-off bar 40 extends between the two sides 38 and provides a convenient location to tie-off cables extending to the rear connectors 30 of each of the jack pairs or monitor jacks. A similar structure of sides 38 and rear tie-off bar 40 may be added to panel 10.

As shown in FIGS. 1 to 3, rear connectors 30 are coaxial cable connectors for receiving standard coaxial BNC connectors. Others sizes and styles of coaxial connectors may be used as well. Front connectors 32 are coaxial cable connectors for connecting to standard size or mid size video plugs. Other sizes and styles of coaxial connectors adapted to receive video plugs may be used as well. It is also anticipated that panels 10 and 110 are not limited to use in a broadcast communications environment but may also be adapted for use in other telecommunications installations where coaxial cable connections are required.

As can be seen in FIGS. 1 to 3, rear connectors 30 may be staggered either horizontally or vertically to improve access to adjacent connectors. This staggering also permits a greater density of jack pairs 26 and 28 and monitor jacks 34 to mounted to panel 10 or 110. Alternatively, rear connectors 30 could be non-staggered where access and density of installation are not as great a concern.

Referring now to FIGS. 4 and 5, a grouping of jack pairs 26 and 28 and monitor jacks 34 mounted to rear 19 of panel front 18 of panel 110 is shown. Monitor jacks 34 are mounted to openings 20 in a monitor row 42. Jack pairs 26 and 28 are mounted in pairs of openings 20 in a row 44. Monitor 34 includes a housing 46 and either a long jack 48 or a short jack 50 mounted within an opening in housing 46.

FIGS. 5A and 5B show a third panel 210 with a single row of openings 20 with a single adjacent row of mounting openings 36. Individual jacks 234 including jack assemblies 50 mounted within a single housing 46, similar to monitor jack 34, may be mounted to panel 210. Panel 210 may provide a separate row of monitor circuits to match up with patching circuits such as shown in panel 10 of FIG. 1. Alternatively, jacks and housings may be mounted to panel 210 to provide patching or circuit connections where the number of circuits is relatively smaller and fewer jack assemblies are needed. Frame 217 includes mounting flanges 22 with openings 24 for mounting panel 210. Mounted to panel front 218 is a plurality of single jacks 234, which may be monitor jacks 34 but may also be individual patching jacks.

Referring now to FIG. 6, a module 54 including three jack pairs 28 mounted to a mounting block 52 is shown. Such a module might be used when a smaller number of patching jacks are required for a particular installation. Alternatively, module 54 might be used with a patch panel including a front face adapted to receive and mount a plurality of modules 54 in a density similar to that of panels 10 and 110, above.

Figure 7:
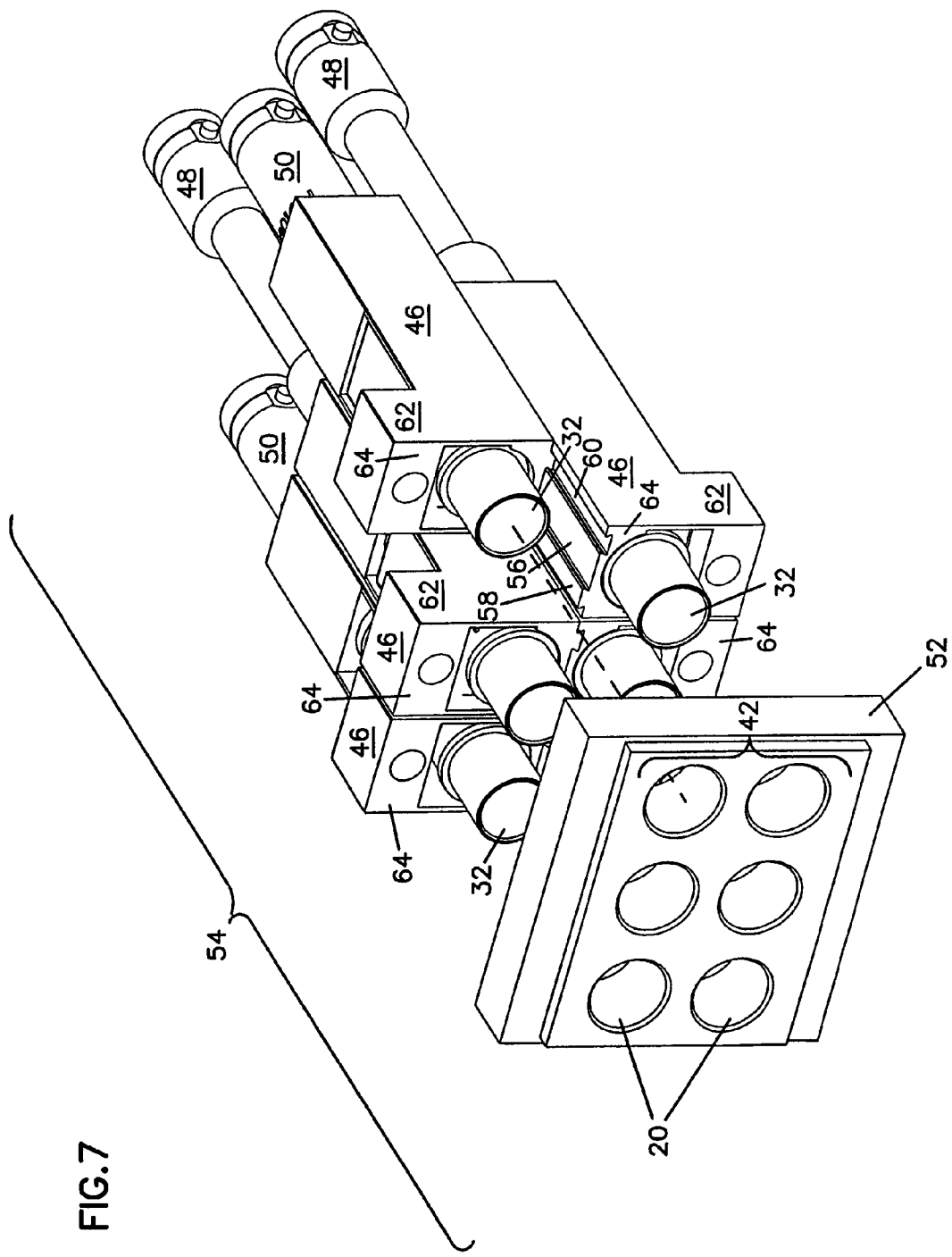
FIG. 7 is a front perspective exploded view of the block of jack pairs of FIG. 6.
Figure 8:
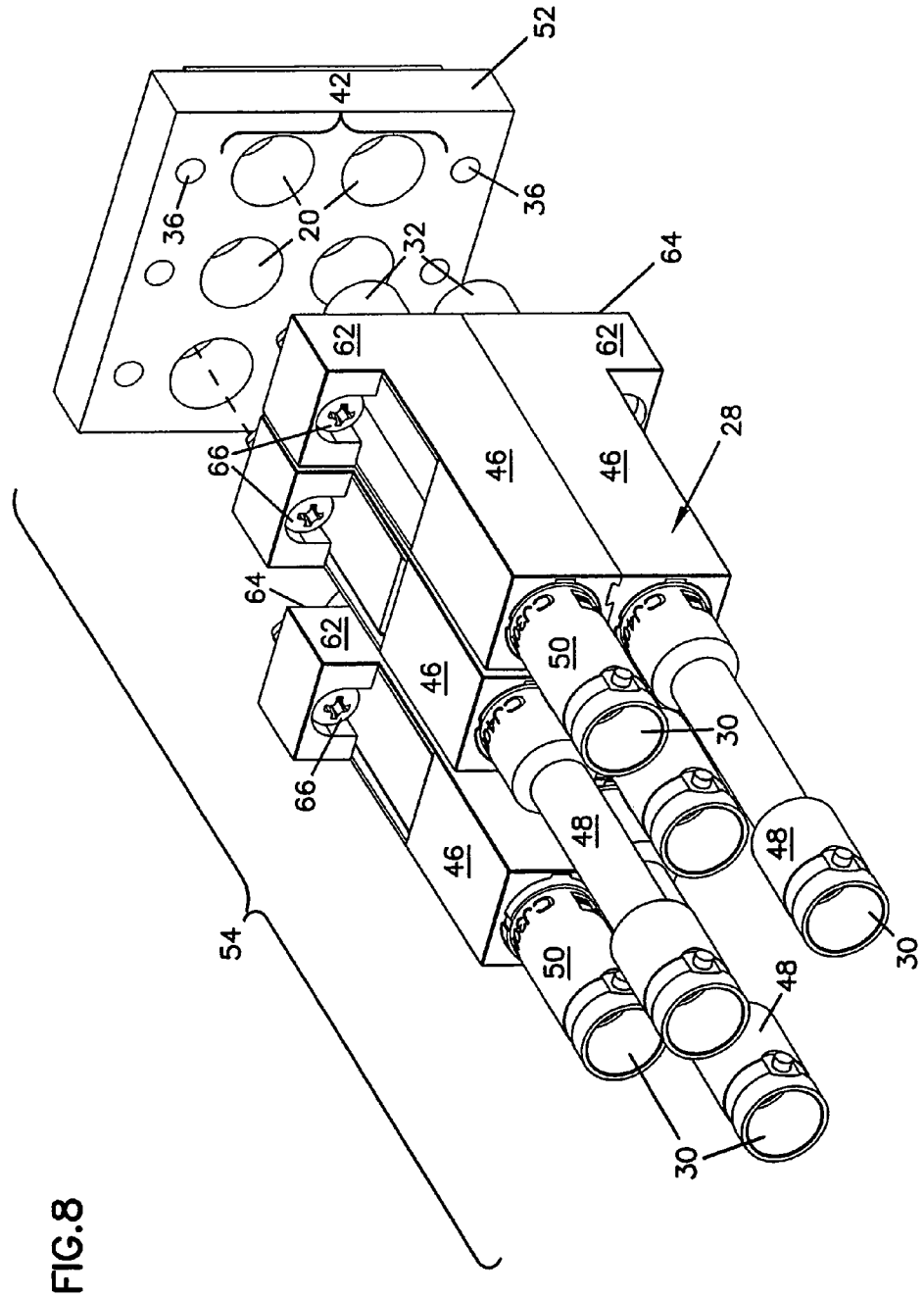
FIG. 8 is a rear perspective exploded view of the block of jack pairs of FIG. 6.

FIGS. 7 and 8 show module 54 of FIG. 6 is an exploded view. Also shown in FIG. 8 is the interconnection between housings 46 of each jack pair 28. Housings 46 are identical housings which mate with each other along a face 56. Face 56 includes a ridge 58 and groove 60. Housing 46 also includes a mounting flange 62 positioned adjacent a first end 64. Ridge 58 and groove 60 are positioned and configured so that the ridge and groove of a first housing 46 cooperate with the groove and ridge, respectively, of a second housing 46 when the first and second housings 46 are positioned with faces 56 and first ends 64 adjacent each other. Ridge 58 and groove 60, and the nature of their cooperation are described in further detail below.

Within an opening in mounting flange 62 of housing 46 is a captive fastener such as a screw 66. Screw 66 engages opening 36 of mounting block 52 and of panel front 18 to removably mount a housing 46, a monitor jack 34 or a jack pair 28. As shown in the FIGS., screw 66 is a captive screw and remains with housing 46 when disengaged from opening 36. It is anticipated that other captive fasteners may be used with housing 46, such as quarter-turn fasteners and similar fasteners.

Figure 10:
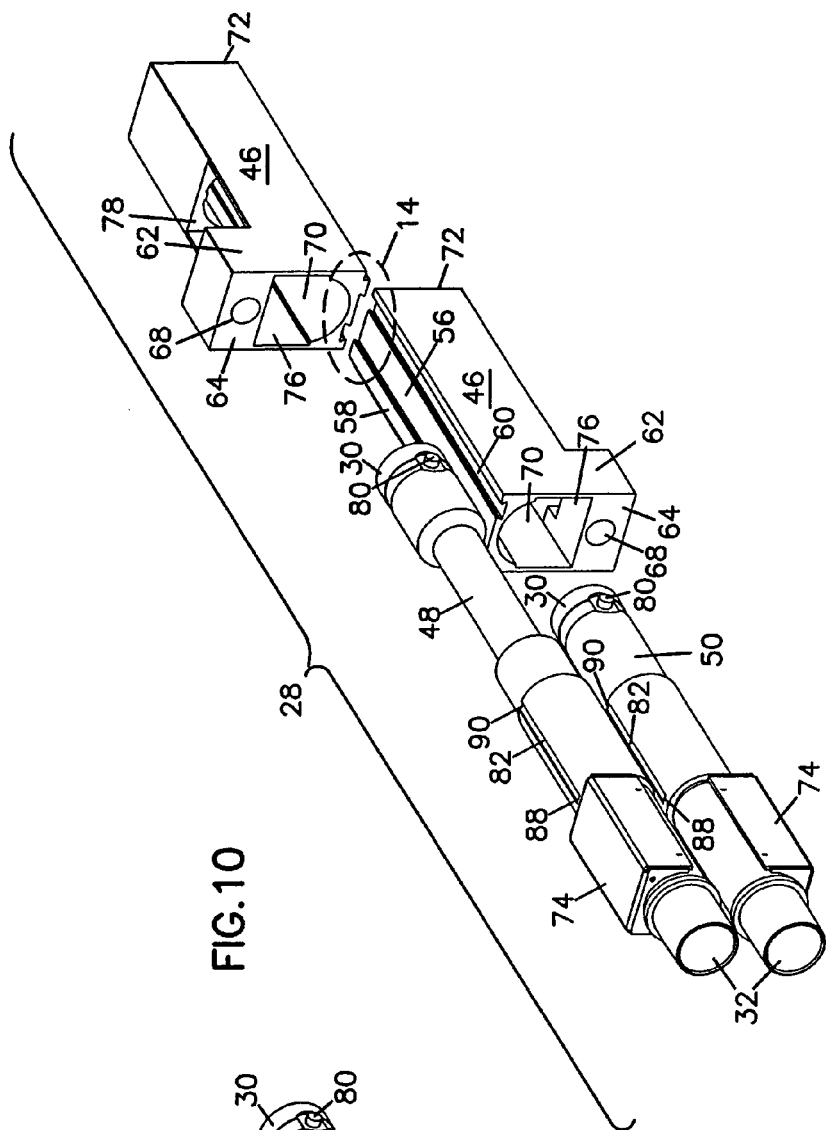
FIG. 10 is a front perspective exploded view of the jack pair of FIG. 9.
Figure 9:
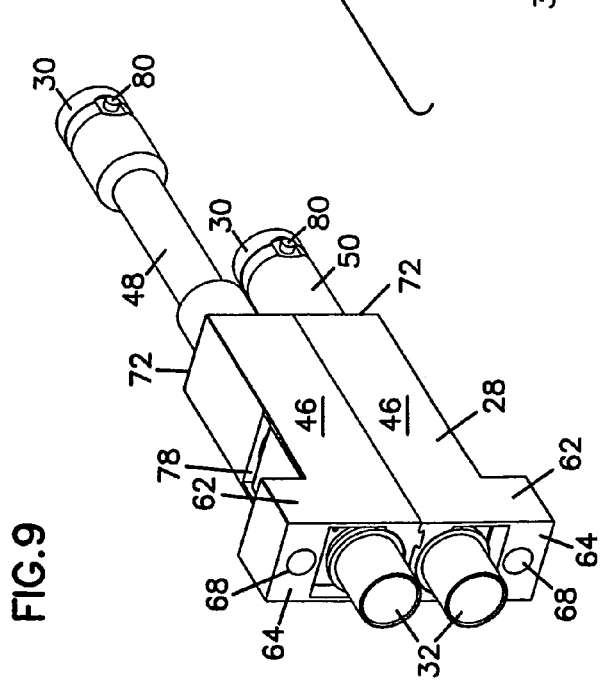
FIG. 9 is a front perspective view of a jack pair in accordance with the present invention.
Figure 12:
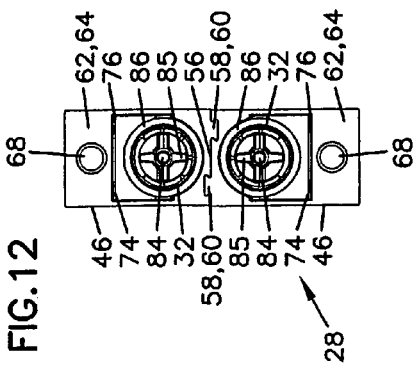
FIG. 12 is an end view of the jack pair of FIG. 9.

FIGS. 9 to 14 illustrate jack pair 28. Referring now specifically to FIG. 10, housing 46 includes an opening 68 for receiving captive screw 66 in flange 62. Screw 66 includes threads which extend through first end 64, as shown in FIGS. 7 and 8, above. Housing 46 also defines a longitudinal opening 70 extending from first end 64 to a second end 72. Jacks 48 and 50 are received within opening 70 through first end 64 so that rear connectors 30 extend through and beyond second end 72. Adjacent front connector 32 of both jacks 48 and 50 is a grounding housing 74. Within grounding housing 74 is circuitry to permit a center conductor 84 (see FIG. 12) of jack 48 or 50 to make electrical contact with and ground to an outer conductive shell 86 (see FIG. 12). An insulator 85 electrical isolates center conductor 84 from outer shell 86 except as the circuitry may ground the two to each other. Opening 70 includes an enlarged portion 76 adjacent first end 64 for receiving housing 74. Enlarged portion 76 does not extend through opening 70 to second end 72 and ends at an intermediate bulkhead 78.

Adjacent rear connectors 30 of jacks 48 and 50 are a pair of opposed bayonets 80 for releasably securing a BNC cable connector to rear connector 30. Each jack 48 and 50 also includes a pair of opposed guide or key slots 82. Each slot 82 includes a closed end 88 and an open end 90. Key slots 82 are oriented parallel to the main axis of jacks 48 and 50 with closed end 88 toward the front connector 32 and open end 90 toward rear connector 30. Key slots 82 are located between grounding housing 74 and rear connector 30.

Figure 14:
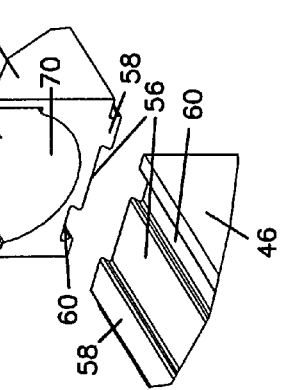
FIG. 14 is an enlarged view of the portion labeled 14 in FIG. 10, showing mating ridges and grooves of the housings of the jacks of the jack pair in greater detail.
Figure 11:
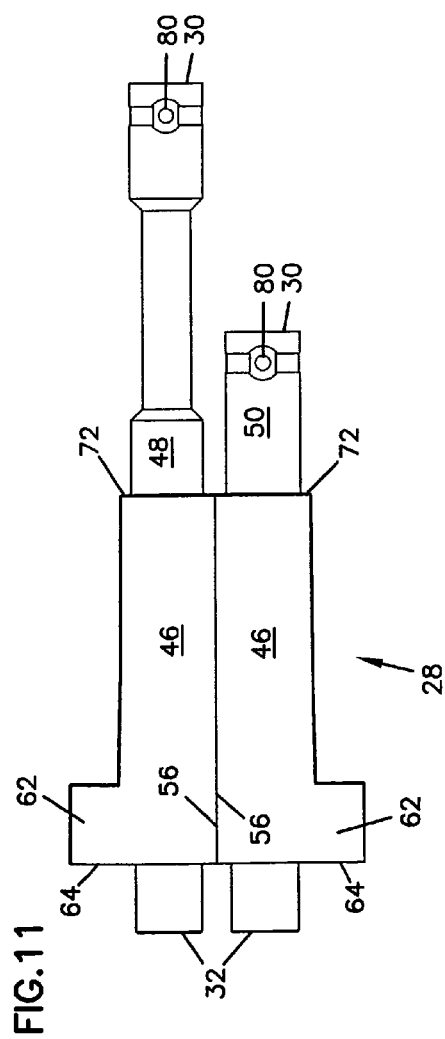
FIG. 11 is a side view of the jack pair of FIG. 9.
Figure 13:
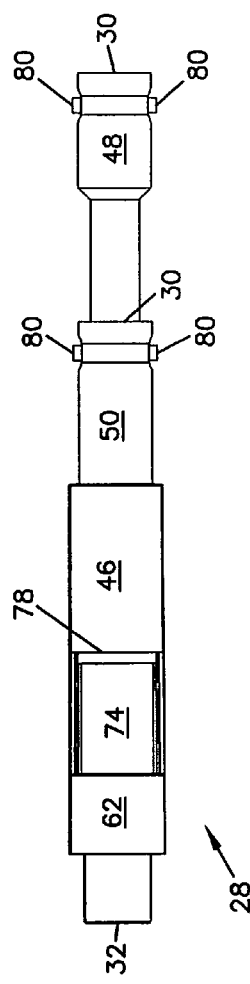
FIG. 13 is a bottom view of the jack pair of FIG. 9.
Figures 23, 24:
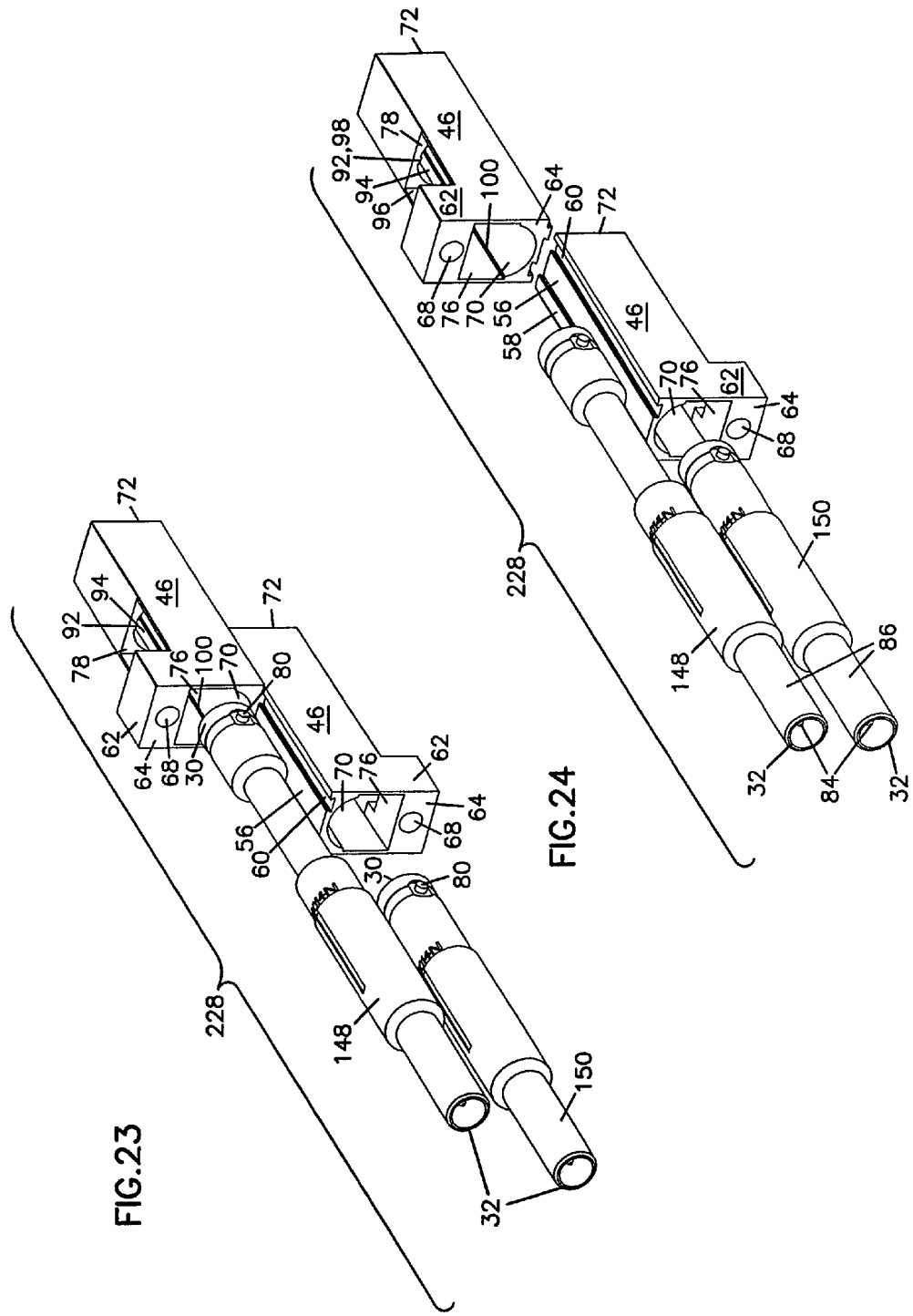
FIG. 23 is a front perspective partially exploded view of the jack pair of FIG. 22.
FIG. 24 is a front perspective exploded view of the jack pair of FIG. 22.

FIG. 14 shows the cooperating shapes of ridge 58 and groove 60. Ridge 58 includes a dovetail shape when viewed from first end 64 or from second end 72. Groove 60 includes a mating shape for receiving the dovetail shape of ridge 58. Further details of these shapes are described below with regard to FIGS. 33 and 34.

Referring now to FIGS. 15 to 18, one half of jack pair 28 is shown, including shorter jack 50. As enlarged portion 76 of opening 70 of housing 46 extends beyond mounting flange 62 toward bulkhead 78, an open top 96 is formed, through which grounding housing 74 is visible. This open top allows maximum room for housing 74 without impeding access to screw 66. Between bulkhead 78 and second end 72 of housing 46, a pair of opposing guides or keys 92 are formed in the top and bottom of opening 70 to engage key slots 82 of jack 50 (and also of jack 48). Keys 92 and key slots 82 cooperate to orient jack 50 (and also jack 48) within housing 46. Bayonets 80 and key slots 82 are offset from each other about jack 50 and with keys 92 engaged in key slots 82, bayonets 80 are oriented horizontally.

Also within opening 70 are opposing bayonet slots 94. Opening 70 is smaller in dimension than the width of bayonets 80. Bayonet slots 94 allow rear connector 30 to be inserted through first end 64 and extend through opening 70 beyond second end 72. Bayonet slots 94 also orient jack 50 so that key slots 82 are correctly oriented to engage keys 92 through open ends 90. When jack 50 is fully inserted and correctly positioned within housing 46, keys 92 adjacent bulkhead 78 engage closed ends 88 of key slots 82, and prevent further insertion of jack 50.

As shown in FIGS. 15 to 18, jacks 48 and 50 each include grounding housing 74. An alternative embodiment jack pair 128 includes jacks 148 and 150, which do not include grounding housing 74, is shown in FIGS. 19 to 21. In other respects, jack pair 128 is similar to jack pair 28. For jacks 48, 50, 148 and 150, key 92 engaging closed end 88 of key slot 82 defines the limit of insertion within housings 46. While jacks 148 and 150 do not require enlarged portion 76 of opening 70, housing 46 is configured to be compatible with multiple types and styles of jacks 48, 50, 148 and 150, as well as other types and styles which may or may not include a grounding housing or another enlarged portion adjacent front connector 32.

FIGS. 22 to 27 illustrate a further alternative embodiment jack pair 228, with front connectors 32 configured to receive a mid-size video coaxial plug. In other respects, jack pair 228 is similar to jack pair 128 of FIGS. 19 to 21 and to jack pair 28 of FIGS. 9 to 14.

FIG. 28 shows prior art switching jack pair 26, including front connectors 32 configured to receive standard size video plugs and rear connectors 30 configured to receive BNC plugs. A pair of mounting flanges 162 extend from opposing sides of a housing 146. Flanges 162 including openings 68 for receiving a captive fastener such as screw 66, shown in FIGS. 16 to 19, above. Openings 68 are positioned so that fasteners within openings 68 may engage openings 36 of panel front 18 or mounting block 52. As shown in FIGS. 1 to 5, above, jack pairs 26, 28, 128 and 128, may all be mounted to panel front 18 as part of patch panel 10 or 110, or as shown in FIGS. 6 to 8, to mounting block 52 as part of module 54.

FIGS. 29 to 34 show housing 46 in further detail. A ledge 100 extends within opening 70 from bulkhead 78 to first end 64 and defines the transition from opening 70 to enlarged portion 76. Ledge 100 also cooperates with bayonet slot 94 to permit bayonets 80 of rear connector 30 to extend through opening 70 in an appropriate orientation for key slot 82 to engage key 92. Keys 92 extend from second end 72 to bulkhead 78 and define an end wall 98 at bulkhead 78. End wall 98 engages closed end 88 of key slot 82 to define a stop. This stop sets the maximum extent that a jack assembly may be inserted within housing 46.

FIGS. 33 and 34 show groove 60 and ridge 58, respectively, in further detail. Ridge 58 includes an outer face 114 defining a maximum width 102 at an offset distance 112 from face 56 of housing 46. Ridge 58 narrows as it approaches face 56 to a minimum width of 104 adjacent face 56. Groove 60 includes an inner face 118 defining a maximum width 106 at inset distance 116 from face 56. Groove 60 narrows as it approaches face 56 to a minimum width 108 adjacent face 56. Ridge 58 and groove 60 are sized so that width 102 fits within width 106 with face 114 adjacent face 118, and width 104 fits within width 108. Distances 112 and 116 are generally equal so that when faces 56 of a pair of cooperating housings 46 are adjacent, face 114 is adjacent face 118. Other similar cooperating shapes may be used for ridge 58 and groove 60 provided they join two identical housing to each other as shown for a jack pair 28, 128 or 228. This joining is accomplished by sliding the housing together longitudinally while preventing the housings from being pulled apart transversely.

The cooperation of the dovetail shape of the cooperating ridge 58 and groove 60 provide several advantages. First, these shapes tie together two housings 46 to form a housing for two jacks in a jack pair, such as jacks 48, 50, 148 and 150. The same housing 46 may be used to hold a single jack, such as shown in monitor jack 34. This reduces the number of different housings that must be produced and maintained in inventory. Secondly, the dovetail configuration locks two housings together while allowing sliding movement in a longitudinal direction. No additional fasteners for connecting the two housings 46 are required. Screws 66 of each housing 46 may then be used to mount housings 46 in a module 54 or a panel 10 or 110.

Housings 46 provide an electrically insulative sleeve about a tubular jack such as jacks 48, 50, 148 and 150 and also provide mechanical support to the jack to resist deflection due to strain from cables attached to rear connectors 30, when the cable exerts a force an angle to the jacks. Panel 110 provides a tie off bar 40 to help reduce the strain that a cable might exert on a jack. Panel 10 does not include such a feature and thus cables attached to a rear connector 30 and hanging directly downward from rear connector 30 may exert an angled force on the jack. Cables may also be pulled toward the side or top. Housing 46 is attached to panel front 18 by fastener 66 with first end 64 against rear face 19, as shown in FIGS. 1 to 5. For either jack pair 28 or for monitor jack 34, this arrangement allows housing 46 to provide additional support to resist such transverse forces. The resistance of transverse forces and the insulative sleeve of housing 46 reduce the likelihood that jacks 48 and 50 or 148 and 150 of a jack pair can be deflected enough to electrically contact each other and cause a short circuit between the two outer insulative shells 86. Housing 46 also provides support against the jacks being deflected enough to permanently deform or break the jacks.

Figure 37:
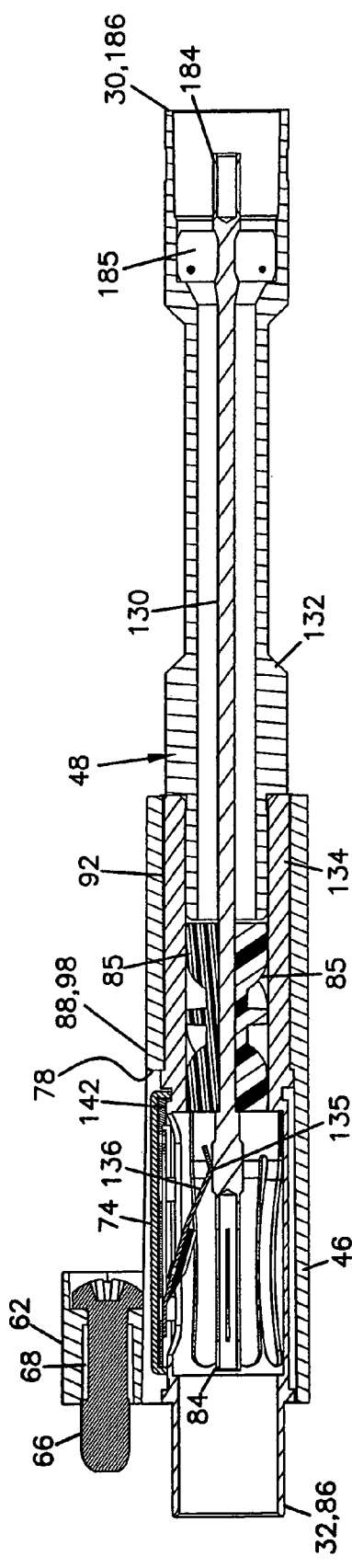
FIG. 37 is a side cross-sectional view of the jack assembly of FIG. 35 positioned within the housing of FIG. 29.

Referring now to FIGS. 35 to 37, jack assembly 48 is shown in greater detail. A first outer housing 134 includes conductive outer shell 86 of front connector 32 as well as slot 82. Mounted within first housing 134 is insulator 85 within which center conductor 84 is mounted. Insulator 85 supports and isolates center conductor 84 from shell 86. As shown, insulator 85 is made from two identical halves or, alternatively, may be made as a single piece insulator. A second outer housing 132 includes a conductive outer shell 186 of rear connector 30. Second outer housing 132 includes a knurled end 133 to aid insertion and retention within first outer housing 134. Mounted within second housing 132 is an insulator 185 within which a center conductor 184 is mounted. Insulator 185 supports and isolates center conductor 184 from shell 186. As shown, insulator 185 is made from two identical halves or, alternatively, may be made as a single piece insulator. A conductive shaft 130 links center conductors 84 and 184.

Figure 40:
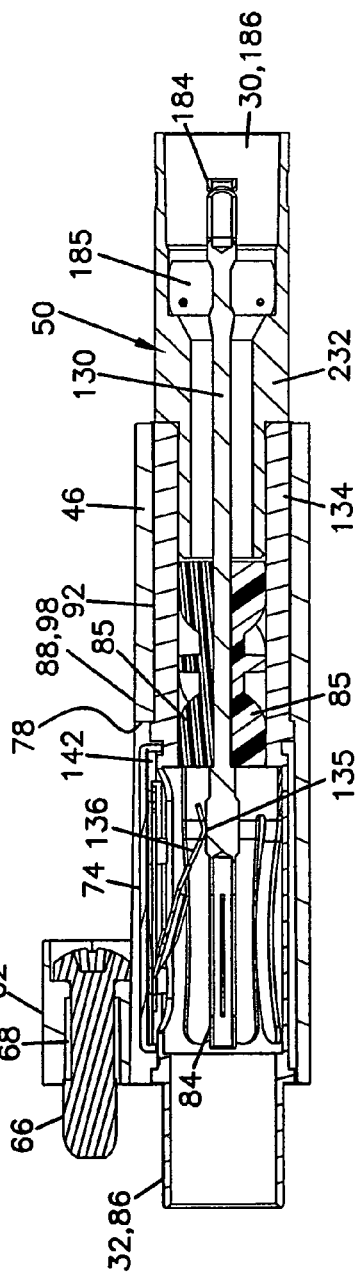
FIG. 40 is a side cross-sectional view of the jack assembly of FIG. 38 positioned within the housing of FIG. 29.

Referring now to FIGS. 38 to 40, jack assembly 50 is shown in greater detail. A first outer housing 134 includes conductive outer shell 86 of front connector 32 as well as slot 82. Mounted within first housing 134 is insulator 85 within which center conductor 84 is mounted. Insulator 85 supports and isolates center conductor 84 from shell 86. As shown, insulator 85 includes two identical halves. Alternatively, insulator 85 may be a single piece insulator. A second outer housing 232 includes a conductive outer shell 186 of rear connector 30. Mounted within second housing 132 is an insulator 185 within which a center conductor 184 is mounted. Insulator 185 supports and isolates center conductor 184 from shell 186. As shown, insulator 185 includes two identical halves. Alternatively, insulator 85 may be a single piece insulator. A conductive shaft 130 links center conductors 84 and 184.

In both jack assemblies 48 and 50, grounding housing 74 combines with a flexible conductive contact member 136, a resistor 140, a pad 141 and a block 142 to define a selective termination device 147, as shown in FIGS. 36 and 39. Termination device 147 is mounted to first housing 134 with a first end 135 of member 136 extending through an opening 138 to contact center conductor 84. A second end 137 of member 136 is mounted to block 142 and is in contact with one end of resistor 140. The other end of resistor 140 is in electrical contact with first outer housing 134 and conductive outer shell 86. When a mating plug is inserted within front connector 32, first end 135 of member 136 is displaced and is no longer in contact with center conductor 84, breaking the termination between center conductor 84 and shell 86. Termination device 147 is attached to first outer housing 132 by depressions 144 of grounding housing 74 engaging depressions 146 of housing 132.

FIGS. 41 to 43 show jack assembly 148 is greater detail. Jack assembly 148 does not include a selective termination device. Thus, a first outer housing 234 differs from first outer housing 134 in that there is no opening providing access to center conductor 84. Other aspects of jack assembly 148 are similar to those of jack assembly 48 shown in FIGS. 35 to 37.

FIGS. 44 to 46 show jack assembly 150 is greater detail. Jack assembly 150 does not include a selective termination device. Thus, a first outer housing 234 differs from first outer housing 134 in that there is no opening providing access to center conductor 84. Other aspects of jack assembly 150 are similar to those of jack assembly 50 shown in FIGS. 38 to 40.

Figure 47:
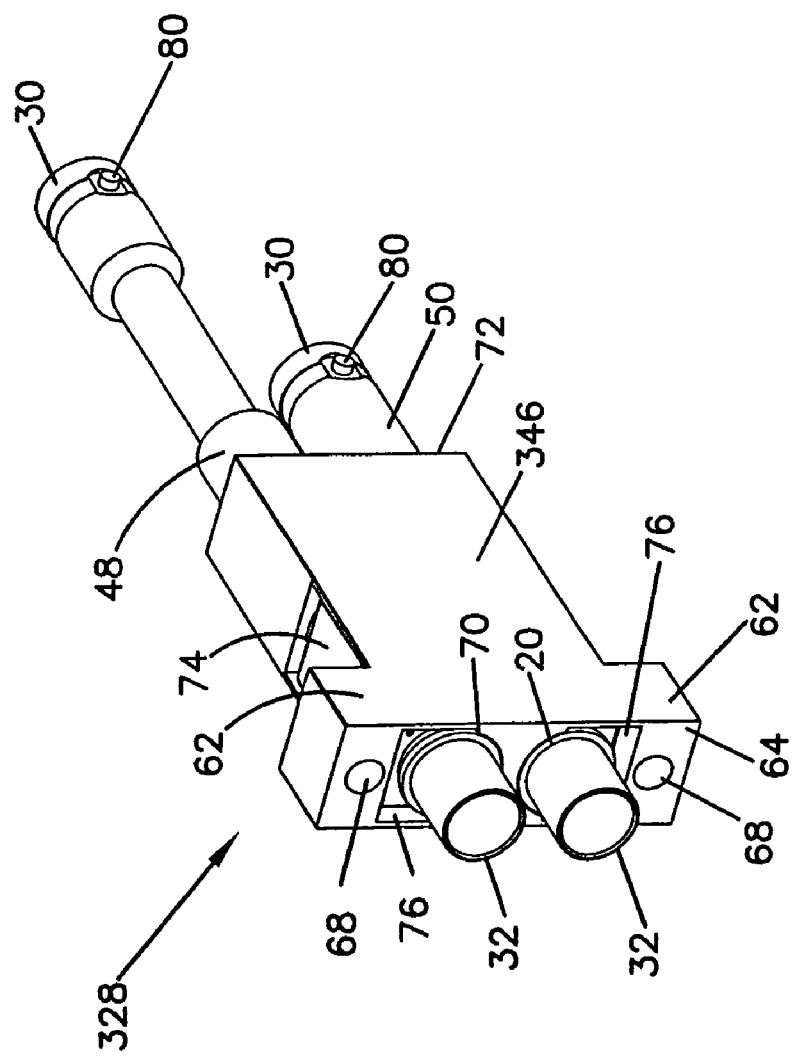
FIG. 47 is a perspective view of an alternative embodiment of a jack pair according to the present invention with a unitary housing.

FIG. 47 shows an alternative jack pair 328 with jack 48 and jack 50 inserted within a pair of openings 70 in a unitary housing 346. Housing 346 is similar to and includes the elements described above with regard to housing 46 with the exception of first face 56, ridge 58 and groove 60. Housing 346 is a single piece housing including both openings 70. Housing 346 provides support and strength to jacks 48, 50, 148 and 150 in a manner similar to housings 46, described above. Housing 346 is also constructed of a non-conductive material to prevent jacks 48 and 50, or 148 and 159, from deflected into contact with each other and creating a short circuit.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A connection assembly comprising:
    a panel including a first side and a second side, the panel including a plurality of connector mounting openings extending from the first side to the second side and a plurality of first fastener openings;
    a first housing with a longitudinal opening and a mounting flange including a second fastener opening for mounting the first housing to the panel by a fastener extending into one of the first fastener openings of the panel, the longitudinal opening including a first mating surface and a stop for limiting the sliding of a first jack assembly within the opening;
    a first jack assembly positioned within the longitudinal opening of the first housing, the first jack assembly including a front connector accessible through one of the connector mounting openings of the panel and a rear connector extending from an end of the first housing opposite the panel, the first jack assembly including a second mating surface, the first and second mating surfaces engaging to prevent rotation of the first jack assembly within the longitudinal opening.

2. The connection assembly of claim 1, wherein the first mating surface of the first housing includes a longitudinally extending key and the second mating surface of the first jack assembly includes a longitudinally extending key slot.

3. The connection assembly of claim 1, further including a second jack assembly and a second housing including a longitudinal opening, the second jack assembly positioned within the longitudinal opening of the second housing.

4. The connection assembly of claim 3, wherein the first and second housings each include an identically configured body with an outer face with a parallel ridge and a groove extending longitudinally along the housing.

5. The connection assembly of claim 4, wherein the ridge and groove of the body of the first housing engages the groove and the ridge of the body of the second housing, respectively, to hold the bodies together.

6. A housing for a coaxial jack, the housing comprising:
    a body extending from a first end to a second end;
    a longitudinal opening extending from the first end of the body to the second end of the body, the longitudinal opening sized to receive the coaxial jack through at least one of the ends;
    the opening including a mating surface to prevent rotation of the coaxial jack within the longitudinal opening;
    the opening including a stop for limiting the coaxial jack from movement within the longitudinal opening in a first direction of further insertion of the coaxial jack in the opening;
    the body including a flange extending from an outer surface of the body and extending generally perpendicular to the longitudinal opening, the flange including an opening to receive a fastener.

7. The housing of claim 6, wherein the mating surface of the opening is a flat.

8. The housing of claim 6, wherein the longitudinal opening includes a pair of opposing flats.

9. The housing of claim 6, wherein the body includes an outer face opposite the flange with a parallel ridge and groove extending longitudinally from adjacent the first end to adjacent the second end.

10. The housing of claim 9, wherein the flange extends from the body adjacent the first end.

11. The housing of claim 6, wherein the mating surface includes a longitudinally extending key.

12. The housing of claim 11, wherein the stop within the opening is an end surface of the longitudinally extending key.

13. The housing of claim 9, further comprising a second identically configured body, the body and the second body positioned with first ends, second ends and outer faces adjacent each other, with the ridge and groove of the body engaging the groove and ridge of the second body, respectively, holding the bodies together with the flanges extending generally oppositely.

14. The housing of claim 13, wherein the ridges are slidably received within the grooves.

15. The housing of claim 14, wherein the ridges define a generally dovetail cross-section and the grooves define a mating opening for the dovetail.

16. A method of mounting a coaxial jack to a piece of telecommunications equipment, the method comprising the steps of:
    providing a panel including a front side and a rear side, the panel including a plurality of openings accessible from the front side and the rear side;
    providing a first jack assembly including a first coaxial connector end and a second coaxial connector end, each of the connector ends adapted to receive and electrically mate with a coaxial connector;
    providing a first housing, the first housing including a first end and a second end and a longitudinal opening extending from the first end to the second end, the first housing defining a stop within the opening, the first housing including an outer face with a longitudinal ridge and a longitudinal groove;
    sliding the second coaxial connector end of the first jack assembly into the opening of the first housing through the first end of the first housing until the stop prevents movement of the first jack assembly within the opening in a first direction of further insertion of the first jack assembly in the opening;
    inserting the first coaxial end of the first jack assembly through one of the plurality of openings of the panel through the rear side such that the first coaxial end is accessible through the front side of the panel; and
    mounting the first housing to the rear side of the panel.

17. The method according to claim 16, wherein the first housing includes a mounting flange opposite the outer face adjacent the first end, the mounting flange including an opening for receiving a fastener for mounting the first housing to the panel.

18. The method according to claim 16, further comprising the steps of:
    providing the first jack assembly with a first guide on an outer shell of the first assembly;
    providing the first housing with a first mating guide within the longitudinal opening, the first guide and the first mating guide cooperating to prevent rotation of the first jack assembly within the first housing; and sliding the second coaxial connector end of the first jack assembly into the opening of the first housing such that the first guide of the first jack assembly engages the first mating guide of the first housing.

19. The method according to claim 18, wherein the first guide of the first jack assembly includes a longitudinal key slot and the first mating guide of the first housing includes a longitudinal key.

20. The method according to claim 18, further comprising the step of:

providing the first jack assembly with a second guide on the outer shell, the second guide provided offset by about 90 degrees in relation to the first guide around a perimeter of the outer shell; and providing the first housing with a second mating guide within the longitudinal opening, the second mating guide provided offset by about 90 degrees in relation to the first mating guide around the longitudinal opening of the first housing.

21. The method according to claim 20, wherein the second guide of the first jack assembly is a bayonet and the second mating guide of the first housing is a bayonet slot.

* * * * *

UNITED STATES PATENT AND TRADEMARK OFFICE
CERTIFICATE OF CORRECTION

| | | |
|---|---|---|
| PATENT NO. | : 7,780,479 B2 | Page 1 of 1 |
| APPLICATION NO. | : 12/150755 | |
| DATED | : August 24, 2010 | |
| INVENTOR(S) | : Khemakhem et al. | |

It is certified that error appears in the above-identified patent and that said Letters Patent is hereby corrected as shown below:

Title page, (*) Notice: insert --This patent is subject to a terminal disclaimer.--

Signed and Sealed this
Twenty-ninth Day of March, 2011

David J. Kappos
*Director of the United States Patent and Trademark Office*